(12) United States Patent
Sadeh

(10) Patent No.: US 12,410,573 B2
(45) Date of Patent: Sep. 9, 2025

(54) HYDROELECTRIC POWER GENERATION AND DESALINATION

(71) Applicant: Ilan Sadeh, Herzliya (IL)

(72) Inventor: Ilan Sadeh, Herzliya (IL)

( * ) Notice: Subject to any disclaimer, the term of this patent is extended or adjusted under 35 U.S.C. 154(b) by 0 days.

(21) Appl. No.: 17/857,331

(22) Filed: Jul. 5, 2022

(65) Prior Publication Data

US 2023/0059325 A1 Feb. 23, 2023

Related U.S. Application Data

(63) Continuation-in-part of application No. 17/784,267, filed as application No. PCT/IB2020/061222 on Nov. 27, 2020, now abandoned.

(60) Provisional application No. 63/217,852, filed on Jul. 2, 2021.

(30) Foreign Application Priority Data

Dec. 10, 2019 (IL) .......................................... 271296

(51) Int. Cl.
E02B 9/00 (2006.01)
F03B 13/10 (2006.01)

(52) U.S. Cl.
CPC ................ *E02B 9/00* (2013.01); *F03B 13/10* (2013.01); *F05B 2220/62* (2013.01)

(58) Field of Classification Search
CPC ......... E02B 9/00; F03B 13/10; F05B 2220/62
See application file for complete search history.

(56) References Cited

U.S. PATENT DOCUMENTS

| 6,396,162 | B1 | 5/2002 | Carrillo | |
|---|---|---|---|---|
| 2008/0023963 | A1* | 1/2008 | Perich | C02F 1/04 202/185.1 |
| 2015/0132151 | A1* | 5/2015 | Fang | F03B 17/06 417/61 |

(Continued)

FOREIGN PATENT DOCUMENTS

| AE | 09-144645 A | 6/1997 |
|---|---|---|
| AE | 2012-026336 A | 2/2012 |

(Continued)

OTHER PUBLICATIONS

JP 09025624 A English Translation (Year: 1997).*

(Continued)

*Primary Examiner* — Viet P Nguyen
(74) *Attorney, Agent, or Firm* — Jose Cherson Weissbrot

(57) ABSTRACT

A hydroelectric power generation system includes at least one conduit extending from beneath the sea surface a predetermined depth into the ground below the sea floor level, a turbine connected to an underground distal end of each of the at least one conduit, and an underground reservoir to collect seawater flowing down through the at least one conduit and the connected turbine. The hydroelectric power generation system may be part of a distributed hydroelectric power generation system which includes a plurality of hydroelectric power generation systems, the distributed hydroelectric power generation system additionally including an underground reservoir to collect seawater flowing down through all of the conduits and connected turbines in the plurality of hydroelectric power systems.

18 Claims, 12 Drawing Sheets

(56) References Cited

U.S. PATENT DOCUMENTS

2018/0290902 A1* 10/2018 Aronson ................ C02F 1/441

FOREIGN PATENT DOCUMENTS

JP          09025624 A * 1/1997
WO    WO-2019074372 A9 * 5/2020 .............. F03B 13/00

OTHER PUBLICATIONS

European Enegy Research Alliance, "Underground Pumped Hydro Storage", European Energy Research Alliance, EERA Joint Program SP4—Mechanical Storage, Fact Sheet 1, 2018, Fig 4, p. 2.
International Search Report of PCT/IB2020/061222, Apr. 25, 2021.
Written Opinion of the International Searching Authority of PCT/IB2020/061222; Apr. 25, 2021.
International Preliminary Report on Patentability (Chapter I of the Patent Cooperation Treaty) of PCT/IB2020/061222; May 17, 2022.

* cited by examiner

HYDROELECTRIC POWER GENERATION AND DESALINATION

RELATED APPLICATION/S

This application is a continuation-in-part of U.S. patent application Ser. No. 17/784,267, filed 10 Jun. 2022, which is a National Phase Application of PCT International Application No. PCT/IB2020/061222, International Filing Date 27 Nov. 2020, claiming priority of Israel Patent Application 271296, filed 10 Dec. 2019, and additionally claims the benefit of priority of U.S. Patent Application 63/217,852, filed 2 Jul. 2021, all of which are incorporated herein in their entirety by reference.

FIELD AND BACKGROUND OF THE INVENTION

The present invention, in some embodiments thereof, relates to electric power generation and to seawater desalination and, more particularly, but not exclusively, to an underground hydroelectric power generation and an electricity based seawater desalination system.

Hydroelectricity is the application of hydropower to generate electricity. One type of hydroelectric power plant may use dammed reservoirs to exploit the energy of falling water. Water in the reservoir may be released, for example, during peak electricity hours or when demand is high, to drive a water turbine to create electricity. The power extracted from the water depends on the volume and on the difference in height between the reservoir and the water's outflow. This height difference is called the head. A large pipe (frequently known as a "penstock") delivers water from the reservoir to the turbine.

Another type of hydroelectric power plant, commonly known as pumped-storage hydroelectric plants, also relies on the use of a reservoir to exploit the energy of falling water. In these plants, hydroelectricity may also be used to store energy in the form of potential energy between two reservoirs at different heights. At times of low electrical demand, the excess generation capacity is used to pump water from the lower reservoir into the higher reservoir. When the demand becomes greater (e.g. during peak demand or otherwise high demand) water is released back from the higher reservoir into the lower reservoir through a turbine generating electricity which may then be fed into the electrical grid.

Still another type of hydroelectric power plant, commonly known as run-of-the-river hydroelectric plants, is located on rivers with small or no reservoir capacity. The plant may use the kinetic energy of water coming from upstream which passes through a turbine and generates electricity which may then be fed into the electrical grid. The water which is used is that which the turbines can handle at any given moment and any oversupply passes unused.

Other forms of electricity generation with hydropower may include tidal power plants which use energy from tidal power generated from oceans, rivers, and human-made canal systems to generate electricity. The most common are used in the ocean.

Desalination of salt water and brackish water (hereinafter also referred to as "salt water") is generally done to produce water suitable for human consumption or irrigation. Due to its energy consumption, desalinating sea water is generally more costly than obtaining fresh water from rivers and from groundwater (e.g. aquifers), or from water recycling. Consequently, desalination plants generally use thermal power for distillation-based desalination processes, or electric power, generally from photovoltaic sources and/or wind power sources, for other types of desalination processes such as, for example, reverse osmosis processes and other membrane-based processes.

The two main membrane-based desalination processes are reverse osmosis (RO) and electro dialysis (ED), although other processes are sometimes used. The RO membrane process uses semipermeable membranes and applied pressure (on the membrane feed side) to induce water permeation through the membrane while rejecting salts. The ED process transports the salt ions from water in a feed compartment which acts as a dilute through ion-exchange membranes placed between electrodes to brine in a second compartment which acts as a concentrate.

SUMMARY OF THE INVENTION

An aspect of the present invention relates to a hydroelectric power generation system including at least one conduit extending from beneath the sea surface a predetermined depth into the ground below the sea floor level, a turbine connected to an underground distal end of each of the at least one conduit, and an underground reservoir to collect seawater flowing down through the at least one conduit and the connected turbine.

In some embodiments, the hydroelectric power generation system includes a generator connected to the turbine.

In some embodiments, the hydroelectric power generation system includes power transmission means to transfer electricity generated by the generator to an electric grid.

In some embodiments, the hydroelectric power generation system includes an inlet valve to control seawater flow through the at least one conduit.

In some embodiments, the hydroelectric power generation system includes an underground pumping system to pump seawater collected in the reservoir into the sea.

In some embodiments, the hydroelectric power generation system includes an underground discharge pipe to transport seawater from the underground pumping system to the sea.

In some embodiments, the hydroelectric power generation system includes an underground feed pipe to transport seawater from the reservoir to the pumping system.

In some embodiments, the hydroelectric power generation system includes a valve to control seawater flow through the feed pipe.

In some embodiments, the hydroelectric power generation system includes an underground outlet pipe to transport seawater from the reservoir to an industrial use seawater distribution system.

In some embodiments, the hydroelectric power generation system includes an outlet valve to control seawater flow through the outlet pipe.

In some embodiments, the hydroelectric power generation system includes a control system to enable turbine operation during hours of high demand for electricity. Optionally, the control system is configured to allow transport of seawater from the underground reservoir to the sea during hours of low demand for electricity.

In some embodiments, the hydroelectric power generation system includes an underground desalination system. Optionally, the underground desalination system includes a reverse osmosis filtration system. Optionally, the reverse osmosis filtration system includes membranes arranged to filter seawater flowing in an upward direction.

In some embodiments, the hydroelectric power generation system includes an underground desalination feed pipe to transport seawater from the reservoir to the desalination system. Additionally, the hydroelectric power generation system includes an inlet valve to control seawater flow through the desalination feed pipe.

In some embodiments, the hydroelectric power generation system includes three conduits.

In some embodiments, the predetermined depth is between 50 meters and 300 meters.

In some embodiments, the at least one conduit is vertically positioned below the seafloor.

In some embodiments, the hydroelectric power generation system includes a sensor to measure an output power generated by a solar energy electricity generating system.

In some embodiments, the hydroelectric power generation system includes a sensor to measure an output power generated by a wind power electricity generating system.

An aspect of the present invention relates to a distributed hydroelectric power generation system including a plurality of hydroelectric power generation systems, each hydroelectric power generation system including at least one conduit extending from beneath the sea surface a predetermined depth into the ground below the sea floor level and a turbine connected to an underground distal end of each of the at least one conduit, and an underground reservoir to collect seawater flowing down through all of the conduits and the connected turbines in the plurality of hydroelectric power stations. Optionally, the underground reservoir includes a tunnel.

In some embodiments, the distributed hydroelectric power generation system includes an underground desalination system.

BRIEF DESCRIPTION OF THE DRAWINGS

Some embodiments of the invention are herein described, by way of example only, with reference to the accompanying drawings. Details shown are for exemplary purposes and serve to provide a discussion of embodiments of the invention. The description and the drawings may be apparent to those skilled in the art how embodiments of the invention may be practiced.

DETAILED DESCRIPTION

Figure 1:
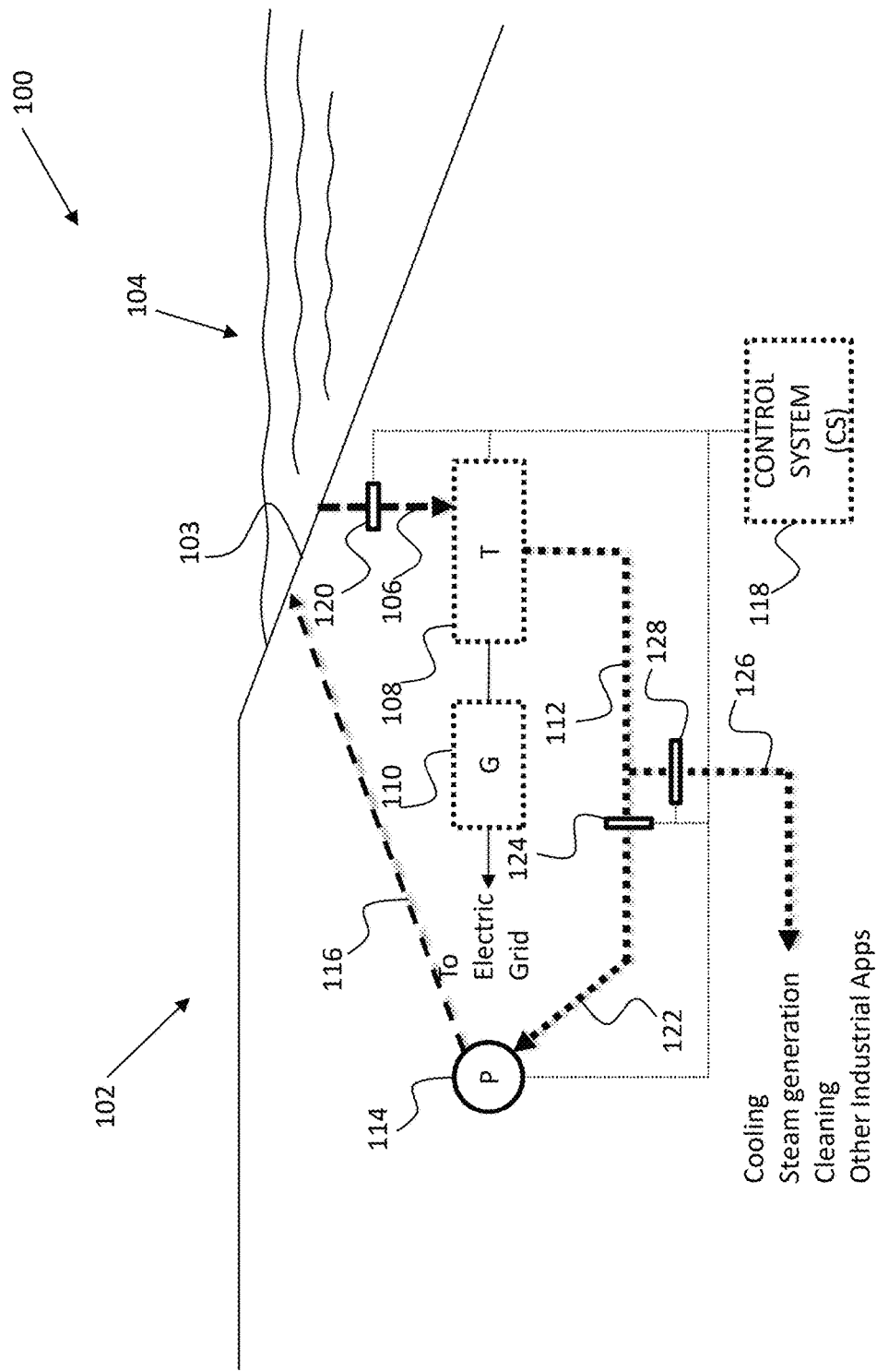
FIG. 1 schematically illustrates an exemplary underground hydroelectric power generation system, according to an embodiment of the present invention.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Hydroelectric power plants serve as a key source for renewable electricity and do not directly emit air pollutants, yet their use may affect the environment. Dams, including those used in run-of-river hydropower plants, and reservoirs, may obstruct fish migration affecting fish populations. They may contribute to changes in water temperatures, water chemistry, river flow characteristics, and silt loads, all of which may affect, and may even result in the loss of aquatic habitat. They may additionally cause deterioration of the surrounding landscape, which may have negative effects on plants and on animals in and around the river. They may even have negative effects on the landscape remotely located from the site of the dam and/or reservoir. Furthermore, greenhouse gases such as carbon dioxide and methane may also be formed in the reservoirs and be emitted into the atmosphere. Additionally, they require relatively large expanses of land, require a predetermined water source such as a river, and require large expenditures associated with dam building.

Applicant has realized that the negative impact of existing hydroelectric power plants may be remedied by taking the plants underground and using the sea as the source of water supply. By placing the turbines underground at a suitable depth below sea level and feeding the turbines with seawater flowing down through conduits from the sea to the turbines, Applicant eliminates the need for dams and aboveground reservoirs, and consequently the negative effects associated with above ground hydroelectric power plants.

In some embodiments, the hydroelectric power generation system may include a plurality of conduits leading underground from the sea floor. Each conduit may be connected to a turbine and generator suitable to generate a predetermined amount of electricity when water flows through the conduit. The conduits may be all be positioned so that their openings are at a same depth in the sea floor or, alternatively, at varying depths. Depending on the topography and the depth of the sea floor, the conduits may be vertically arranged so that water falls vertically from the opening directly unto the turbines, or alternatively, some or all of the conduits may be slopingly arranged (at an angle) or may include sloping sections so that water flow from the sea through the conduit may be at an angle relative to the surface of the sea. Optionally, the opening to the conduits may be above the sea floor (and not at the depth of the sea floor). The conduits may include tunnels, penstocks, channels, pipes, or other suitable means to transport liquids (e.g., sea water) from the water source to the underground turbines.

In some embodiments, the hydroelectric power generation system may include a single conduit with a single large opening (single entry conduit) which may be split into multiple smaller conduits each with its turbine and generator suitable to generate a predetermined amount of electricity. Alternatively, the single conduit may include a large turbine and generator suitable to generate the amount of electricity equivalent to that of using multiple turbines.

In some embodiments, the hydroelectric power generation system may include an underground reservoir to store the seawater flowing through the conduits and the turbines. The hydroelectric power generation system may additionally include a pumping system which may serve to pump the water from the underground reservoir back to the sea. The underground reservoir may be an underground lake, or an underground tunnel, or other type of facility which may collect and hold the incoming seawater. Optionally, existing underground train tunnels (subways tunnels) may be used.

In some embodiments, the hydroelectric power generation system may include a control system configured to control hydroelectric power generation system operation including when the conduits are opened to allow seawater flow to the turbines, to control turbine and generator operation, and to control the pumping system to return the water to the sea. It may be appreciated that the control system may be effectively used to maximize the economic viability of the hydroelectric power generation system by (1) generating electricity during hours of high demand and peak demand for electricity (when prices are highest) and supplying the electricity to the grid by allowing seawater flow through the conduits and activating the turbines and generators during these hours, and (2) by activating the pumping system during hours of low electricity demand when grid electrical prices are lowest and pumping the water accumulated in the underground reservoir back up to the sea.

It may be appreciated that the hydroelectric power generation system of the present invention may be used in a distributed system made up of multiple hydroelectric power generation systems, where each hydroelectric power generation system may be located relatively proximal to a designated consumer power grid. The proximity to the consumer power grid may minimize the distance over which the generated electricity is transferred to the grid, reducing transmission loss and investment in transmission equipment and maintenance, increasing the viability of the hydroelectric power generation systems. The distributed hydroelectric power generation system may include an underground reservoir formed as a tunnel which may interconnect all the hydroelectric power generation systems. As an example of a distributed hydroelectric power generation system, a town A may have its own hydroelectric power generation system and a town B twenty kilometers away may also have its own hydroelectric power generation system, and both may share a common underground reservoir which may be a tunnel interconnecting the two systems.

It may be further appreciated that the distributed hydroelectric power generation system may not only be advantageous due to the proximity of the hydroelectric power stations to the consumer but also by potentially centralizing operations associated with use of the seawater in the reservoir. For example, pumping the seawater back to the sea may be centralized in a single pumping system in lieu of one for each system. Also, the use of a single reservoir may allow centralizing the processing or use of the seawater for other purposes, described hereinafter, rather than having each hydroelectric power generation system do its own processing. Furthermore, one control system may be employed for all the hydroelectric power generation systems instead of a control system for each hydroelectric power generation system.

Applicant has further realized that the benefits provided by the underground hydroelectric power generation system of the present invention may be further enhanced by utilizing the seawater flowing through the turbines and accumulated in the underground reservoir for other purposes. In an embodiment of the present invention, an underground desalination system may be used to desalinate the seawater to produce drinking water and/or water for agricultural use. In another embodiment, the seawater may be used in industrial applications such as for cleaning, cooling, and/or generating steam, among other suitable applications.

A major problem with desalination plants today is that, as a byproduct of producing fresh water, large amounts of brine are produced. Many of these desalination plants are close to shore and, as a result, pump the brine back into the sea. Pumping the brine back into the sea may negatively affect the ecosystem as the brine tends to sink to the sea bottom, increasing water salinity and depleting oxygen levels in the water. Other problems with desalination plants may include relatively large amounts of carbon emissions due to use of carbon fuels associated with the plants' high energy demand, and negative environmental impact on shore land areas including plant life and wildlife due to the large surface areas occupied by the plants, among other problems. Additionally, they require large land expanses and generate noise pollution.

Applicant has additionally realized that the negative impact associated with desalination plants, especially those close to shore, may be remedied using the underground desalination system and the water accumulated in the underground reservoir from the hydroelectric power generation system. By having the desalination system underground (1) the desalination system does not affect the close to shore ecosystem, (2) the seawater from the underground reservoir may be used both to produce fresh water and also to dilute the brine before being pumped back to the sea, (3) carbon emissions are eliminated as the desalination system may operate on electricity from the grid when the electricity rates are at their lowest (lowest electricity demand) additionally making the system economically viable, (4) large land expanses are not necessary as the plants are underground, and (5) noise pollution is eliminated as any noise generation is done underground.

In some embodiments, the desalination system may include use of reverse osmosis in the desalination process. Alternatively, the system may include use of electro dialysis in the desalination process. Alternatively, the system may include use of distillation in the desalination process. It may be appreciated that other existing desalination processes may be used, and that presently non-existing processes may alternatively be used in the future as they are developed.

In some embodiments, seawater may flow through the conduits and may drop several hundred meters, for example, 100 to 200 meters or more, with the turbines converting the gravitational energy into electric energy. The seawater may be directly directed into a reverse osmosis desalination facility where the water may be pumped upwards under pressure through the reverse osmosis filters, allowing the heavier brine to sink downwards. The brine may then be pumped out to the deep sea where it may minimally affect the marine ecosystem. Alternatively, the brine may be seeped into a brackish water aquifer so that it does not contaminate freshwater reservoirs.

In the above system, water is not stored in a reservoir so there is no financial gain from utilizing electricity price differences between day and night. On the other hand, there is a gain in the hydroelectric energy production as approximately 30% of the water mass entering the conduits is returned back to sea while 70% of the seawater mass is returned to the seabed as brine. Advantages associated with this system include (a) lack of a need for a large underground reservoir, (b) twenty-four hour operation is possible, (c) relatively low cost engineering to set up the system, and (d) the system is independent of exterior weather conditions and other natural condition.

Applicant has further realized that the system of the present invention may additionally serve to drain crowded urban areas during flooding. The underground water reservoir may absorb the large water flow of flood waters which may help to prevent flooding. The flood waters may be routed to the conduits, which may be optionally positioned throughout a city, and therethrough into the reservoir. Optionally, electricity may be generated using the flood waters as the water flows down the conduits and through the turbines.

It may be appreciated that the distributed underground hydroelectric power generation and optional seawater desalination system may offer many advantages compared to existing above-ground systems. In addition to some of the previously mentioned advantages, other advantages include: (a) the source of energy is seawater which is available in unlimited amounts; (b) manpower is minimal with most operations performed automatically and controlled by a computer system; (c) integration of the reverse osmosis desalination system to the hydroelectric electricity production system may be smoothly performed with no electricity cost for the desalination process; (d) the distributed hydroelectric electricity production system eliminates transmitting the generated over long distances to local grids; (e) the requirement for large land expanses is eliminated as all is underground; and (f) system operation is not influenced by external natural conditions nor weather conditions.

Applicant has additionally realized that that the distributed underground hydroelectric power generation and optional seawater desalination system may serve as energy backup for a solar energy electricity generating station in order to allow it to serve as an active power station at all times. Additionally or alternatively, the distributed underground hydroelectric power generation and optional seawater desalination system may serve as an energy backup for a wind power electricity generating station. For example, the system may be set up proximal to a solar energy electricity generating plant that is turned off during hours without sun. At this time the system may enter into operation to compensate for the loss of solar energy generated power. The system may include a sensor which may detect a drop in solar energy generated power and may open the inlet valves in the conduits to allow water to fall from the sea into the underground reservoir, thereby generating electricity as the water flows through the turbines. When the solar energy electricity generating station returns to normal operation, the water may be pumped out of the reservoir using the electricity generated by the solar energy electricity generating station to activate the pumps, or alternatively, the water may be allowed to flow into a salt water or brackish water aquifer if available. Similarly, the system may be set up proximal to a wind power electricity generating station and, when the sensor senses a drop in the wind power electrical output, the inlet valves may be opened to allow water flow through the turbines.

It may be appreciated that, when the amount of water pumped back into the sea is the same as the amount that flows through the conduits, there is no energy gain but there is still a financial gain due to a high efficiency of about 90%. Use of this pumped storage technique provides a substantial improvement over the use of storage batteries which are costly and require constant maintenance. An additional advantage may be provided by allowing the water to seep into a seawater or brackish water aquifer which reduces the amount of water which is pumped back into the sea, providing for both an energy gain and a financial gain. The use of seepage may be potentially advantageous in regions with soil characteristics associated with dry desert areas, for example, as may be found in the state of California, the Sahara desert, Namibia, and in Australia, among many others.

It is generally assumed that hydroelectric energy may be produced in arid areas only with a large investment and based on existing rivers. One prominent example in the Middle East and Africa is the Aswan Dam.

Applicant has realized that this assumption is incorrect. Applicant has further realized that there are alternative ways of producing hydroelectric energy at a low cost and with many additional benefits based on seawater found almost everywhere. This solution may be a revolution in green energy production in arid coastal areas.

Previously (and as described in greater detail in the Detailed Description), Applicant described dropping seawater onto underground turbines to generate hydroelectric power. The seawater flowing through the underground turbines is then further processed through desalination, and/or pumping back to the sea, and/or other applications. Optionally, the seawater is accumulated in a holding facility (underground lake, tunnel, etc.) prior to the further processing.

Applicant has realized that the collected water may be transported through a tunnel or other type of suitable conduit to areas where there is demand for water, whether for drinking purpose or for other uses, including recreational use. This may prove practical when there is a lower area not far from the sea. For example, the Jordan Valley.

The desalination may be done prior to transport, or alternatively somewhere along the transport (optionally at the end of transport). For other uses, for example, for recreational purposes, the water may be transported as seawater (or brackish water) to a distant recreational "desert" lake, optionally man made.

In some embodiments, an artificial lake may be established in the desert, potentially offering maximum viability. Such a lake may provide solutions for the improvement of the desert such as tourism, fishing in the lake, and agriculture. There are numerous artificial lakes, for example, in Nevada and Arizona in the United States, "Lake Nasser"

near the Aswan dam in Egypt, in southern Israel, in Be'er Sheva, Netivot, Timna, Yeruham and others.

In some embodiments, the artificial lake may be fed by mining a tunnel near the sea. The energy production is carried out by dropping water, as previously described, to produce hydroelectric energy, disposing of part of the water by seeping into the depths and pumping the remaining water to feed the lake in the desert as a balance for evaporation. Although water pumping costs energy, it has great economic value.

As an example, a suitable location in Israel for such a seawater transport tunnel combined with a desert lake, is an underground hydroelectric power station in the Zikim area and from there in a tunnel to a lake in the Rafah and Halutza sands area. This location will provide energy and livelihood for the residents of the Gaza Strip and Israel, including electricity and as a tourist and fishing site. It is noted that there is already an infrastructure of deep fishponds in the Egyptian Rafah area. A water desalination facility may also be added.

In another example, the lake tunnel may extend from the Mediterranean to a lake in the Jordan Valley. A preferred location for the construction of a "Jordan Lake" in the Jordan Valley may be at a level of 200-250 meters below sea level. Optionally, electricity generation may be done by discharging seawater in the tunnel from an underground electricity generation facility in the coastal area while utilizing the natural height difference.

It may be appreciated that, alternatively to generating electricity by dropping underground near the sea, the electricity generation may be performed by discharging seawater at zero level in the tunnel, streaming the water and dumping the water at the Jordan Valley cliff and generating electricity at a facility in the Jordan Valley. It is noted that a canal may be used instead of a tunnel. Nevertheless, a potential advantage of a tunnel over a canal is that there is no engineering problem in digging in a straight track, no landowner permits are required, and no land expropriation is required It is noted that there are few places in the world where there is a lower place than sea level a relatively short distance from the coast. Aside from the Jordan Valley in the Middle East region, area there is also a "Katara valley" in Egypt. A tunnel from the coast to the Jordan Valley at a level of 200 meters below sea level is approximately 72 km. Mining of the tunnel may continue, assuming parallel operation of two mining machines, for about 3 years (according to the example in Switzerland, the Goddard project). A tunnel from the coastal plain to the cliffs of the Jordan Valley at sea level is on the order of 60 km. Mining of the tunnel may continue, assuming parallel operation of two mining machines, for about 2.5 years (according to the example in Switzerland, the Goddard project).

It may be appreciated that "Lake Jordan" may serve as a site for winter tourism: sun, heat, sea water, spas, and historical sites. It may parallel the success of Dubai. Dubai is thriving thanks to winter tourism. There are few places in the Northern Hemisphere that can provide easy access for tourists to sun and sea water. The lake may also serve as an excellent habitat for sea fish close to the market in Jerusalem, Judea, and Samaria. It may provide a livelihood for the residents of the Palestinian Authority and Israel.

In some embodiments, the lake tunnel may extend from the Mediterranean to the Ma'ale Adumim area and to a lake in the Jericho Gilgal area. Other options may include a tunnel from the Springs of the Yarkon and transport of Yarkon water to the Saratba area. A lake is possible as an extension of Lake Tirza. (This is fresh water or has low salinity). This will be a 60 km long tunnel.

It may be appreciated that there is a demand for supply of drinking water to Jordan and other neighboring countries, as described further on below. A desalination plant may be built in the Jordan Valley area at a reasonable cost.

Following are parameters and considerations which may be considered in determining how much electricity may be produced daily using a lake tunnel from the Mediterranean Sea to feed a lake in the Jordan Valley:

a. MGH is used as the general formula for gravitational energy.
b. High efficiency is assumed with losses only up to 5-10%.
c. H is the height difference assumed at 300 meters between the sea and the tunnel exit which feeds a waterfall assumed of a height of 200 meters. It is possible to create such a pit artificially. There are several sites on the cliffs of the Jordan Valley that maintain this, such as the Saratva and Mitzpe Jericho.
d. MG is the weight of falling water.
e. The project is physically divided into three: an upper reservoir, a tunnel, and a lower reservoir. The upper reservoir is the sea and therefore the amount of water is unlimited.
f. The tunnel may have a 16-meter-diameter. That is, a cross-sectional area of 200 square meters. The capacity of the tunnel may be sufficient for any reasonable water flow and may feed several outlets to the turbines to generate electrical energy in the generators.
g. The capacity of the lower reservoir, a lake in the Jordan Valley, may be calculated to compensate for daily losses due to evaporation, water seepage, and water consumption. The following parameters may be considered: (1) evaporation in the Dead Sea area on a lake area of 200 square kilometers is 2 million cubic meters of water per day; (2) water seeping rate depending on the type of soil; (3) water consumption for agriculture and industry; (4) drinking water consumption which may include a high demand for drinking water supply to Jordan, Judea and Samaria and the Palestinian Authority (it is noted that Jordan is in need of low-cost fresh water and a desalination facility can be built in the Jordan Valley area at a reasonable cost; and (5) the flow of water to the Dead Sea may be controlled according to needs.

For comparison purposes, it is noted that the Aswan Dam is only 111 meters high. The amount of water in the Nile is much larger but only a small part of the flow is used to drive the turbines and produce energy. The Aswan Dam incorporates a hydroelectric power plant with 12 generators (generators), each with a power of 175 megawatts and a total of 2,100 megawatts. A similar approach may be used in the Jordan valley example.

The following describes a general concept describing Israel as a supplier of drinking water for neighboring countries, for example, Jordan and the norther section of Saudi Arabia. Some of the points described herein may have been previously addressed above. It is noted, the skilled person may readily appreciate that the example provided herein may be readily applicable to other geographical locations around the world, appropriately modified according to the conditions at each particular location.

Israel may be one of the few places in the world, where at a distance of tens of kilometers from the sea, there is a huge height difference (Jordan Valley). This figure allows for the generation of electrical energy, at costs that make its production feasible, optionally by transporting water to the edge of the Jordan valley and dropping it into turbines located at the bottom of the valley edge. Furthermore, it allows for transporting huge amounts of water from the Mediterranean to Jordan and Saudi Arabia, with two stations on their way, a desalination station and a hydroelectric station.

(1) Water:

In the coastal area of Israel, there is an unlimited amount of water: flood water, sewage water, and of course, sea water. On the other hand, in the Kingdom of Jordan (mainly the Amman region and Fark) and in northern Saudi Arabia, there is a permanent shortage of water, with their needs amounting to approximately 4 billion cubic meters of water a year. And they have no viable option for getting water at a reasonable price. Today, Israel transfers water from the Sea of Galilee to Jordan, which also requires pumping to raise the water (from the Sea of Galilee at a height of 200+ meters) to Amman and its surroundings (1250+ meters).

(2) Energy:

One cubic meter of water falling vertically from a height of 250 meters produces 0.7 kWh. The amount of energy produced in a given period of time will be obtained after doubling the amount of water falling. Therefore, the higher the water consumption to be transferred east to Jordan and Saudi Arabia, then the amount of energy produced increases in direct proportion. That is, economic viability increases greatly with increasing consumption. Hence, from an economic standpoint, it is worth giving cheap water to the Kingdom of Jordan as long as it is pumped and there is a strong water flow. The alternative for Jordan is to transport seawater from Aqaba to the Amman area; a distance of 350 km compared to 50 km from the Jordan Valley to the Amman area. The same is true of the desert region in the joint and northern Saudi Arabia. The demand for desert water is almost endless and will allow Saudi Arabia to develop and flourish the desert in its northern region. The hydroelectric energy produced per year in an amount of water of 4 billion cubic meters is about 3 billion kWh. This energy will be added to the amount produced in Israel.

(3) Water Desalination:

The water may include a mix of seawater and fresh water. Therefore, conditioning and desalination is cheaper. There are various options for the location of the desalination plant, with the main component to be considered being the saline discharge (over 50% of the water) without harming the environment. Coarse filtration may be used in the coastal areas with possible discharge of the brine back into the sea. Gentle filtration may be performed in Jordan as most of the brine was pumped into the sea during the coarse filtering, with the final desalination performed in Jordan. It is noted that energy for the desalination process will be required, which may involve the use of natural gas as an energy source. If electricity, it may be done at night to not overload the power stations.

(4). Design Alternatives:

Following are several exemplary design alternatives:

(i) Yarkon Jordan Tunnel—A tunnel, a channel, or other type of conduit, may be used to transfer water from the sources of the Yarkon River to the cliffs of the Jordan Valley in the Ma'ale Ephraim area. Length of the tunnel is approximately 50 km. At the edge, a water drop of 250 meters high may feed a large-scale hydroelectric power plant in the Jordan Valley. The power is estimated at 500 to 1000 megawatts, regardless of the weather or hours of sunshine.

On the water supply side to the east, there is an option to create a water lake in the Jordan Valley which may offer a potential for millions of tourists a year (i.e., Dubai-style winter tourism). A large desalination and/or purification facility may be used in the Jordan Valley, optionally, with sewage and waste discharges to the Dead Sea.

The existing Yarkon channel may be used, optionally increasing water flow volume by deepening the channel. The channel may be used to draw in seawater and also for rainwater draining from the Gush Dan area, providing for utilization of seawater and floodwaters effectively for the benefit of the residents of the area.

(ii) Sorek Jordan Tunnel—Additionally or alternatively to the Yarkon Jordan Tunnel may be the Sorek Jordan Tunnel. A tunnel, channel, or other suitable conduit may be used to transport the water from Nahal Sorek in the area of Road 6 to the cliffs of the Jordan Valley in the Kedar area—Mitzpe Jericho. The length is again approximately 50 km. Again, At the edge, a water drop of 250 meters high may feed a large-scale hydroelectric power plant in the Jordan Valley. The power is estimated at 500 to 1000 megawatts, regardless of the weather or hours of sunshine.

Again, on the water supply side to the east, there is an option to create a water lake in the Jordan Valley which may offer a potential for millions of tourists a year (i.e., Dubai-style winter tourism). A large desalination and/or purification facility may be used in the Jordan Valley, optionally, with sewage and waste discharges to the Dead Sea.

A tunnel, channel, or other suitable conduit from the Ashdod beach along the Nahal Sorek channel may be used. The channel may be used to draw in seawater and also for rainwater draining from the Ashdod area, providing for utilization of seawater and floodwaters effectively for the benefit of the residents of the area.

(iii) Netanya Tirza Tunnel—Additionally or alternatively to the Yarkon Jordan Tunnel or the Sorek Jordan Tunnel may be the Netanya Tirza. A tunnel, channel, or other suitable conduit may be used to transfer the water from the area of Road 6 to the cliffs of the Jordan Valley in the area of Nahal Tirza. The length is approximately 45 km. At the edge, a water drop of 200 meters high may feed a large-scale hydroelectric power plant in the Jordan Valley. The power is estimated at 400 to 800 megawatts, regardless of the weather or hours of sunshine.

Again, on the water supply side to the east, there is an option to create a water lake in the Jordan Valley which may offer a potential for millions of tourists a year (i.e., Dubai-style winter tourism). A large desalination and/or purification facility may be used in the Jordan Valley, optionally, with sewage and waste discharges to the Dead Sea.

The existing Alexander river may be used, optionally increasing water flow volume by deepening the channel. The channel may be used to draw in seawater and also for rainwater draining from the Sharon area, providing for utilization of seawater and floodwaters effectively for the benefit of the residents of the area.

5. Contributions:

(i) Green energy electricity: a large-scale low-cost hydroelectric power plant in the Jordan Valley will provide a significant portion of the State of Israel's electricity consumption in "green energy" and at low and fixed costs.

(ii) Tourism and flowering of the Jordan Valley: a water lake in the Jordan Valley. "Lake Jordan" can be a site for winter tourism: sun, heat, sea water, spas and historical sites. Dubai is a good example of successful implementation. Dubai is thriving thanks to winter tourism. The lake will serve as an excellent habitat for sea fish close to the market in Jerusalem and Judea and Samaria.

(iii) Flood control and water drainage: flood waters and other water drainage may be safely expelled from populated areas with adequate water drainage control.

Reference is now made to FIG. 1 which schematically illustrates an exemplary underground hydroelectric power generation system 100, according to an embodiment of the present invention. In describing hydroelectric power generation system 100, reference will be made to a distributed system including a plurality of conduits, each conduit supplying seawater to a turbine connected to a generator. The conduits may include tunnels, penstocks, channels, among other suitable water and other liquid conduits. Notwithstanding, the skilled person may readily appreciate, as previously described, that hydroelectric power generation system 100 may include a single entry conduit which may be divided into smaller conduits with each smaller conduit feeding seawater to a turbine connected to its generator or alternatively, a single large conduit which may feed seawater to a single large turbine connected to a generator.

Hydroelectric power generation system 100 may be located below the surface of ground 102 and may generate electricity from seawater obtained from sea 104. Hydroelectric power generation system 100 may include a plurality of conduits 106 extending downwards from sea floor 103, a plurality of turbines T 108 through which seawater dropping through the conduits may pass to cause them to rotate, a plurality of generators G 110 connected to the turbines and configured to generate electricity into the electric grid responsive to the turbines rotations, an underground reservoir 112 to store the seawater which drops through the conduits after passing through the turbines, a pumping system 114 to pump water from the reservoir back into the sea, a seawater discharge pipe 116 to transport the pumped water to sea 104, and a control system 118 to control operation of all the hydroelectric power generation system components. Hydroelectric power generation system 100 may additionally include other components which may be identified further on below with reference to the above system components and to system operation. It is noted that, although designated and shown as underground reservoir 112, the reservoir may not necessarily be located underground but may be located above ground at a height below that of turbines T108, for example, above ground in a land area below sea level.

It is known that the amount of hydroelectric power produced by a hydroelectric plant depends on two factors, (1) the height of the water drop, and (2) the amount of water flowing through the turbine. It may then be appreciated that in deciding at which depth to place turbines 108 in order to have generators 110 generate a predetermined amount of electricity, there may be a tradeoff between the height of conduits 106 (the vertical distance water drops) and the cross-sectional area of the conduits (the amount of water flowing through the turbines). The height of the conduits 106 may determine the depth at which turbines 108 are to be located, and optionally the overall depth of hydroelectric power generation system 100 (including the depth of reservoir 112) below ground 102. For example, depending on the amount of electricity to be generated and the types of turbines and generators to be used, the height of conduits 106 may be chosen to be between 50 to 300 meters, although not limited to this range and may be greater than 300 meters or lesser than 50 meters.

In some embodiments, the conduits 106 may be arranged vertically from sea floor 103, as shown, so that the seawater drops vertically onto turbines 108. Alternatively, the conduits 106 may be sloping or may include sloping sections. Optionally, conduits 106 may protrude upwards from sea floor 103. Conduits 106 may include protective netting (not shown) at the opening to prevent marine life from entering the conduit. Conduits 106 may include an inlet valve 120 which may be controlled by control system 118. Control system 118 may open valve 120 to allow seawater flow into conduits 106, optionally during hours of high electricity demand and/or peak electricity demand, and may close valve 120 to prevent seawater flow into the conduits, optionally during hours of low electricity demand.

In some embodiments, the seawater that has passed through turbines 108 may be collected in underground reservoir 112. Reservoir 112 may be formed as a large tunnel or underground lake or other type of seawater holding facility. Its size may be determined a number of factors such by the amount of electric power to be generated by hydroelectric power generation system 100, the amount of water which is to be discharged back to the sea and the pumping capacity of pumping system 114, and the amount of collected water which may be used for other purposes as described further on below (e.g. desalination, industrial applications, etc.). As previously noted, although designated and shown as underground reservoir 112, the reservoir may not necessarily be located underground but may be located above ground at a height below that of turbines T108, for example, above ground in a land area below sea level.

In some embodiments, the seawater collected in reservoir 112 which is to be discharged back into sea 104 may be transported through a feed pipe 122 to pumping system 114. A valve 124 controlled by control system 118 may be opened to allow seawater flow from reservoir 112 through feed pipe 122 to pumping system 114, and may be closed to prevent seawater flow from the reservoir through the pipe.

In some embodiments, the seawater collected in reservoir 112, additionally or alternatively to being discharged back to sea 104, may be used for industrial applications such as cooling, cleaning, steam generation, among others. This seawater may be transported through an outlet pipe 126 to locations or facilities where it will be used. A valve 128 controlled by control system 118 may be opened to allow seawater flow from reservoir 112 through outlet pipe 126 to the distribution system of the industrial use seawater, and may be closed to prevent seawater flow from the reservoir through the pipe.

It may be appreciated that operational modes of the hydroelectric power generation system of the present invention, in its various embodiments, may be automatically controlled by a control system (e.g. control system 118 in hydroelectric power generation system 100) and may include opening and closing of valves, activating and deactivating system components, among numerous other functions which may be performed by the control system. To avoid repetitively describing the operational modes of the hydroelectric power generation system in it various embodiments described herein and control system interfacing in the operation, FIG. 10 includes a flow chart which describes an exemplary operation of the hydroelectric power generation system, according to an embodiment of the present invention. The skilled person may readily appreciate that the flow chart may be implemented with more or less steps, or with a different sequence of steps, for each embodiment.

Figure 2:
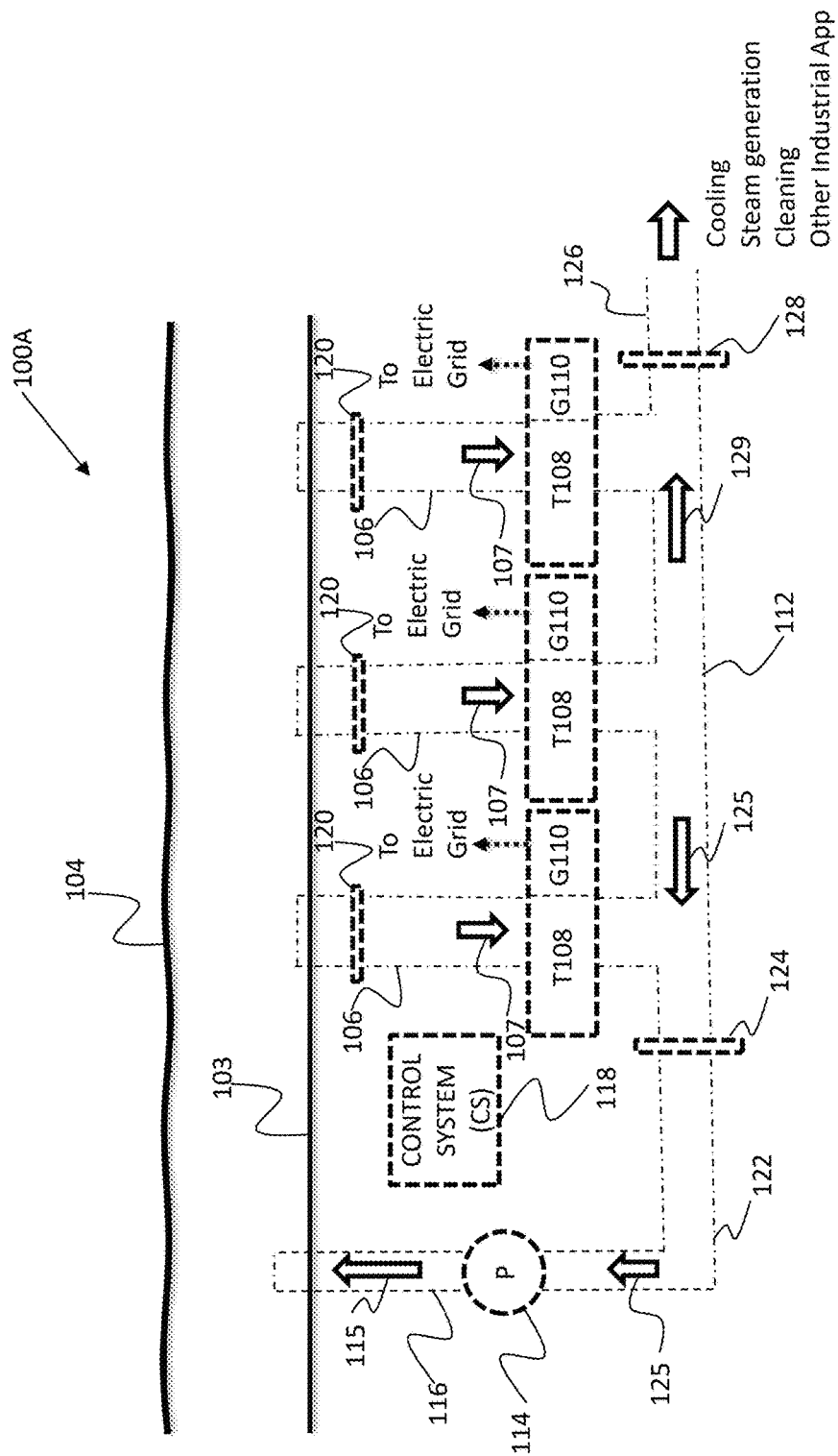
FIG. 2 schematically illustrates an exemplary implementation of the hydroelectric power generation system shown in FIG. 1 with multiple conduits, according to an embodiment of the present invention.

Reference is now made to FIG. 2 which schematically illustrates an exemplary implementation of hydroelectric power generation system 100 shown in FIG. 1 with multiple conduits, according to an embodiment of the present invention. Hydroelectric power generation system 100A shown in the figure may include three conduits 106 extending underground from sea floor 103, each conduit leading to underground hydropower turbine T108 connected to a generator G110, both of which may be functionally similar to hydropower turbines 108 and generators 110 in hydroelectric power generation system 100. Hydroelectric power generation system 100A may additionally include pumping system 114, control system 118, reservoir 112, discharge pipe 116, feed pipe 122, outlet pipe 126, and valves 120, 124, and 128, all functionally similar to that in hydroelectric power generation system 100.

In operation, responsive to opening of three inlet valves 120 in conduits 106, seawater flows down the three conduits, as indicated by arrows 107, through three turbines T108. Rotational motion in three turbines T108 causes three generators G110 to generate electricity which is transferred to the electric grid through appropriate electric transmission lines and wires. The seawater passing through turbines T108 may then be collected in reservoir 112. It may be appreciated that not all three inlet valves 120 may have to be opened, that only one inlet or two inlet valves 120 may be opened so that only one turbine T108 and one generator G110, or two turbines T108 and two generators G110, respectively, may operate.

The seawater accumulated in reservoir 112 may be discharged to sea 104 and/or may be used for industrial applications (e.g. cooling, steam generation, cleaning, etc.). To discharge accumulated seawater back to sea 104, feed valve 124 is opened to allow seawater flow, as shown by arrow 125, through feed pipe 122. Pumping system 114 then pumps the seawater out discharge pipe 116, as shown by arrow 115. To discharge the accumulated seawater for use in industrial applications, outlet valve 128 is opened to allow seawater flow, as shown by arrow 129, through outlet pipe 126.

Figure 3:
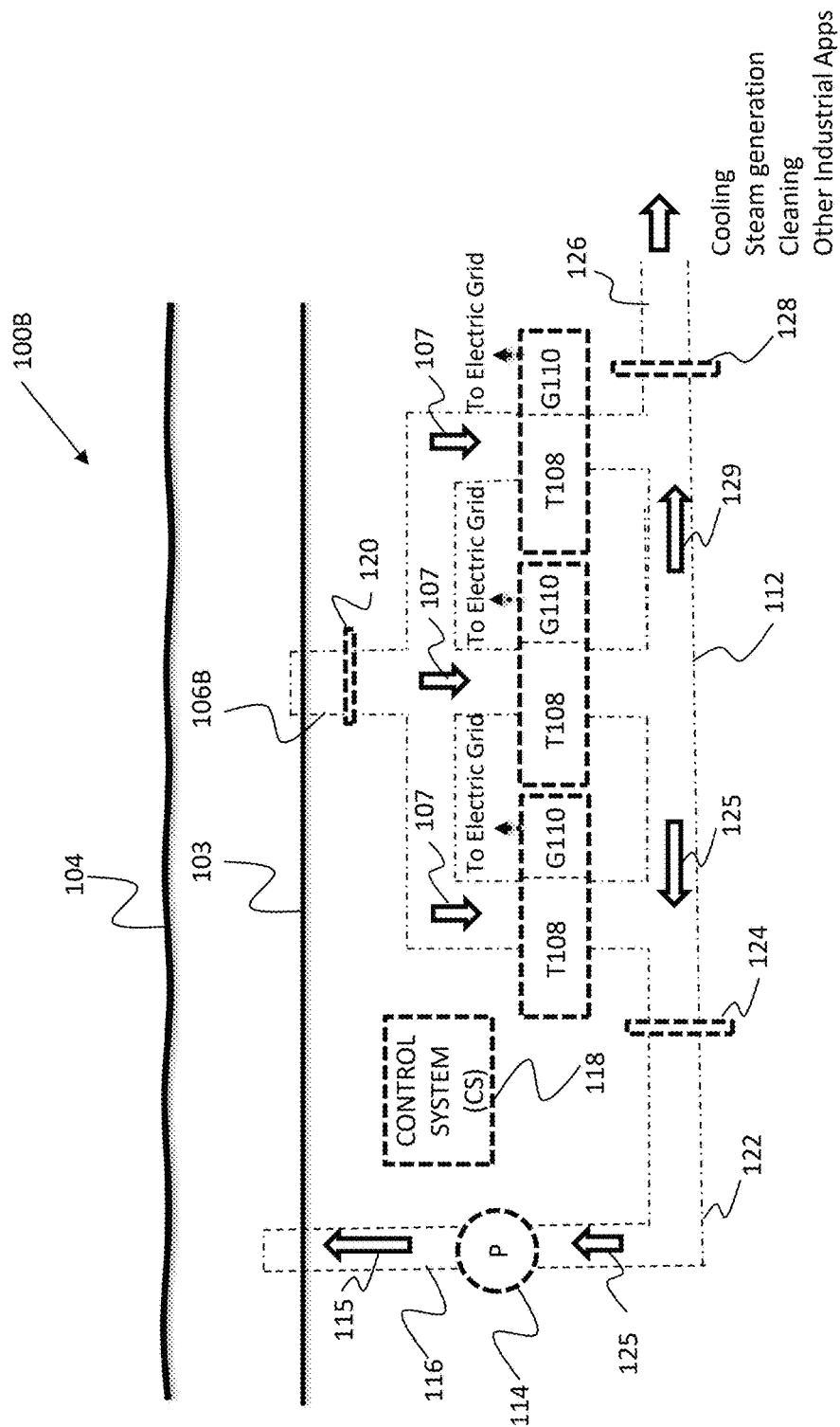
FIG. 3 schematically illustrates an exemplary implementation of the hydroelectric power generation system shown in FIG. 1 in a modified configuration of the hydroelectric power generation system shown in FIG. 2, according to an embodiment of the present invention.

Reference is now made to FIG. 3 which schematically illustrates an exemplary implementation of hydroelectric power generation system 100 shown in FIG. 1 in a modified configuration of hydroelectric power generation system 100A shown in FIG. 2, according to an embodiment of the present invention. Hydroelectric power generation system 100B shown in the figure is similar to hydroelectric power generation system 100A with the difference that the hydroelectric power generation system shown in the figure includes a large single entry conduit 106B with one inlet valve 120 which divides into three smaller conduits which then connect to three turbines T108. The skilled person may readily appreciate that the embodiments shown in FIGS. 2 and 3 are functionally similar and that practicing the teachings associated with the systems shown therein and their operation do not deviate from the teachings of the present invention.

Figure 4:
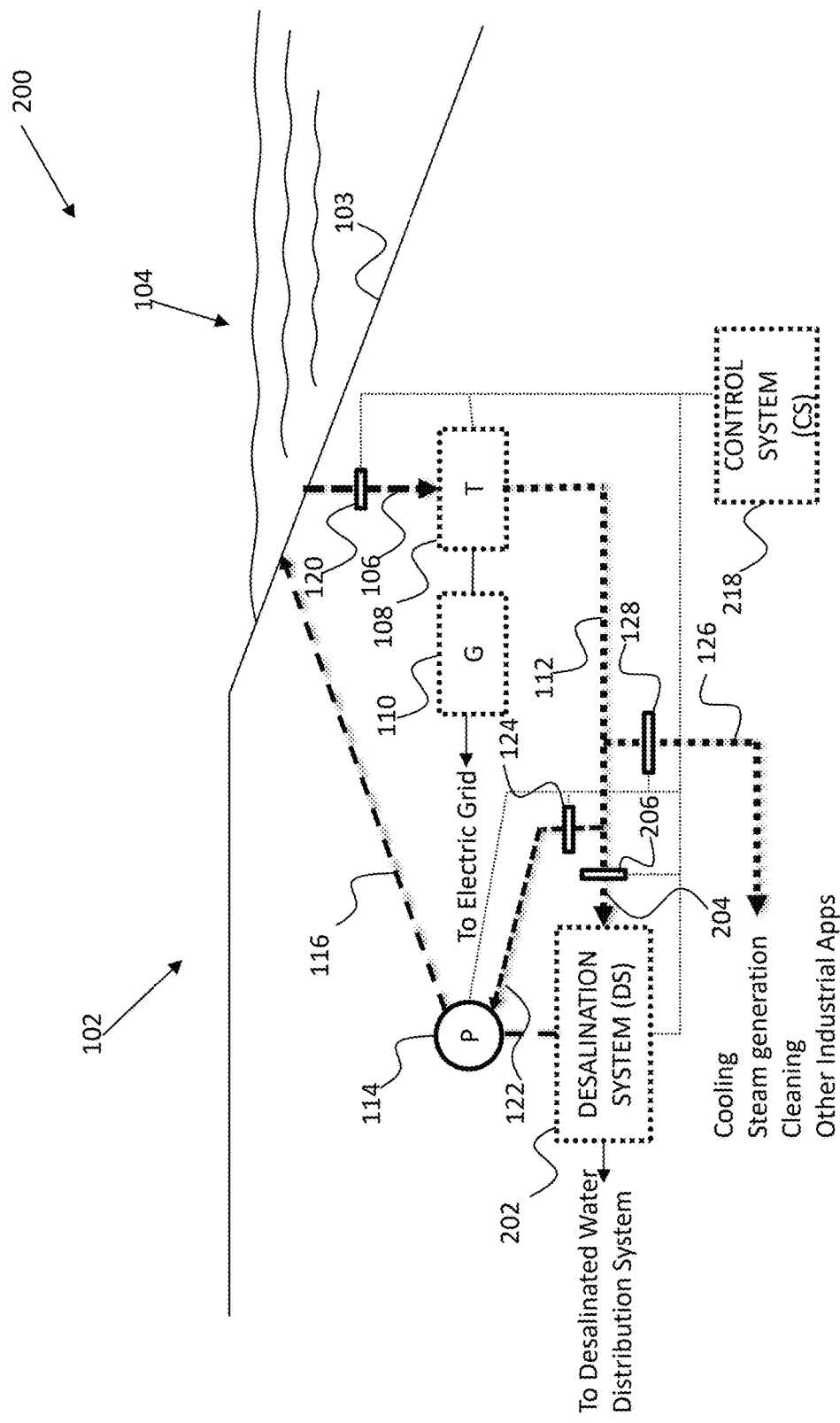
FIG. 4 schematically illustrates an exemplary underground hydroelectric power generation system and combined desalination system, according to an embodiment of the present invention.

Reference is now made to FIG. 4 which schematically illustrates an exemplary underground hydroelectric power generation system and combined desalination system 200, according to an embodiment of the present invention. Underground hydroelectric power generation system and combined desalination system 200, hereinafter referred to as combined system 200, may include hydroelectric power generation system 100 shown in FIG. 1 with appropriate modifications to include desalination system 202 as described herein.

In some embodiments, combined system 200 may include a control system 218 which may be similar to control system 100 but may be modified to functionally control desalination system 202 and/or its associated components, including their operation. Combined system 200 may additionally include a DS feed pipe 204 to transfer seawater from reservoir 112 to desalination system 202 for desalination. A DS inlet valve 206 optionally controlled by control system 218 may be opened to allow seawater flow into DS feed pipe 204 or may be closed to prevent seawater flow into the pipe.

In some embodiments, desalination system 202 may use a reverse osmosis process to desalinate seawater from reservoir 112 to produce fresh drinking water and/or water for agricultural use. Reverse osmosis (RO) is a water purification process that uses a partially permeable membrane to remove ions, unwanted molecules and larger particles from drinking water. In reverse osmosis, an applied pressure is used to overcome osmotic pressure, a colligative property that is driven by chemical potential differences of the solvent, a thermodynamic parameter. Reverse osmosis can remove many types of dissolved and suspended chemical species as well as biological ones (principally bacteria) from water, and is used in both industrial processes and the production of potable water. The result is that the solute is retained on the pressurized side of the membrane and the pure solvent is allowed to pass to the other side. The seawater in desalination system 202 may include filtration tanks which may be positioned underground at a depth which is above that of reservoir 112. Seawater from reservoir 112 may be pumped upwards into the filtration system which may use gravitational forces to assist in the separation of the heavier brine in the seawater from the rising seawater. Alternatively, the filtration tanks may be at a same depth as reservoir 112 and the seawater may be pumped horizontally into the filtration system. Alternatively, other known desalination processes may be used, including electro dialysis and distillation, among others.

In some embodiments, the brine resulting from the desalination process may be pumped out to sea 103 by means of pumping system 114 and discharge pipe 116. Optionally, the brine may be first diluted with seawater from reservoir 112 flowing in through feed pipe 122.

Figure 5:
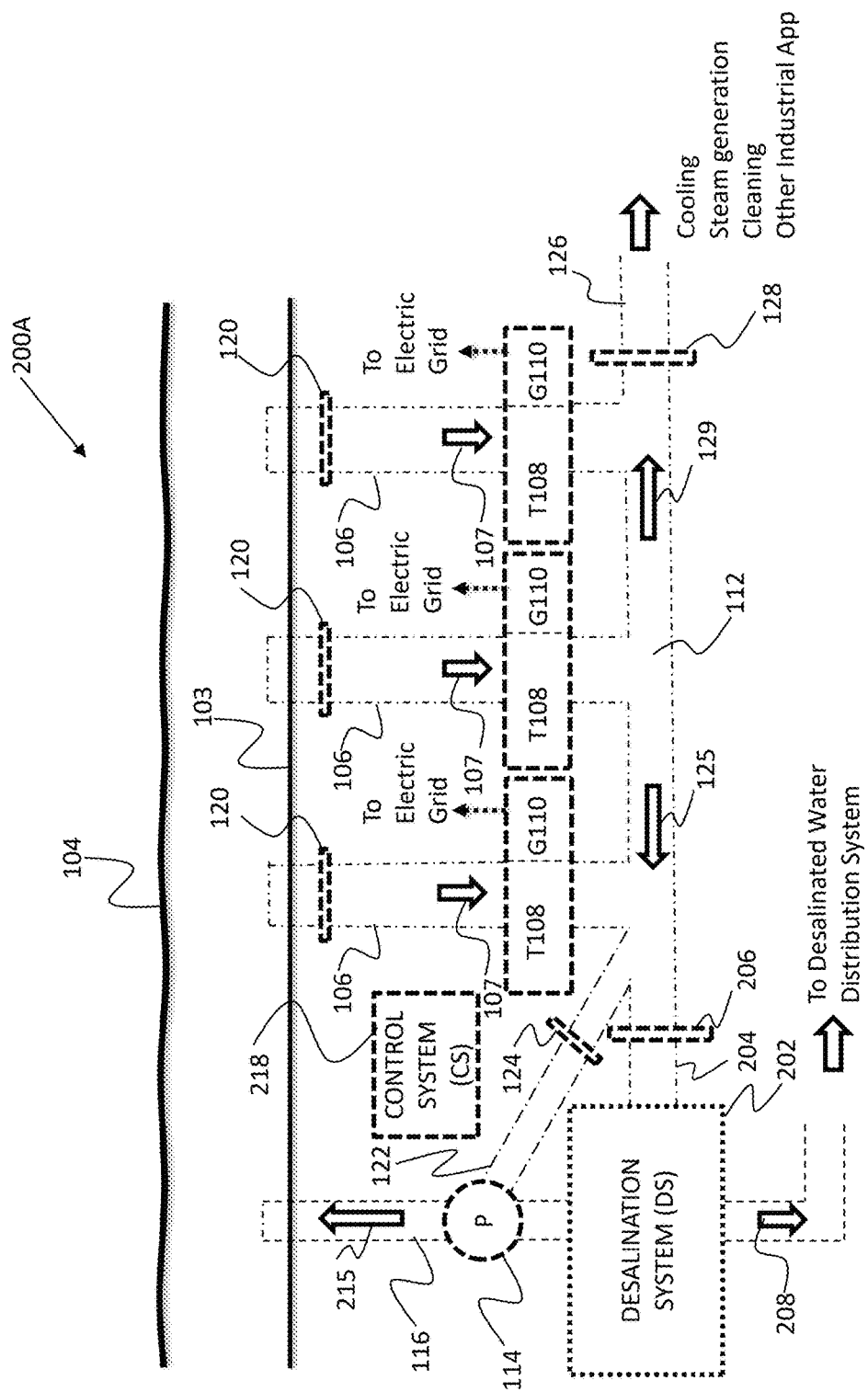
FIG. 5 schematically illustrates an exemplary implementation of the combined system shown in FIG. 4 with multiple conduits, according to an embodiment of the present invention.

Reference is now made to FIG. 5 which schematically illustrates an exemplary implementation of combined system 200 shown in FIG. 4 with multiple conduits, according to an embodiment of the present invention. Combined system 200A shown in the figure may include three conduits 106 extending underground from sea floor 103, each conduit leading to underground hydropower turbine T108 connected to a generator G110, both of which may be functionally similar to hydropower turbines 108 and generators 110 in hydroelectric power generation system 100. Combined system 200A may additionally include pumping system 114, control system 218, reservoir 112, discharge pipe 116, feed pipe 122, outlet pipe 126, and valves 120, 124, and 128, all functionally similar to that in hydroelectric power generation system 100. Combined system 200A additionally includes desalination system 202, DS feed pipe 204, and DS inlet valve 206. In operation, the generation of hydroelectric power is similar to the operation of hydroelectric power generation system 100A shown in FIG. 2.

The seawater accumulated in reservoir 112 may be discharged to sea 104, may be used to produce desalinated water, and/or may be used for industrial applications (e.g. cooling, steam generation, cleaning, etc.). As previously described with regards to FIG. 2, to discharge accumulated seawater back to sea 104, feed valve 124 is opened to allow seawater flow, as shown by arrow 125, through feed pipe 122. Pumping system 114 then pumps the seawater out discharge pipe 116, as shown by arrow 215. Also as previously described with reference to FIG. 2, to discharge the accumulated seawater for use in industrial applications, outlet valve 128 is opened to allow seawater flow, as shown by arrow 129, through outlet pipe 128.

For desalination, DS inlet valve 206 may be opened to allow seawater flow from reservoir 112 through DS feed pipe 204 into desalination system 202 where the seawater is desalinated. The desalinated water may then flow out, as shown by arrow 208, to a desalinated water distribution system. The collected brine, as previously described, may be discharged to sea 103, as shown by arrow 215, by means of pumping system 114 and discharge pipe 115, optionally following dilution with seawater flowing from feed pipe 124.

Figure 6:
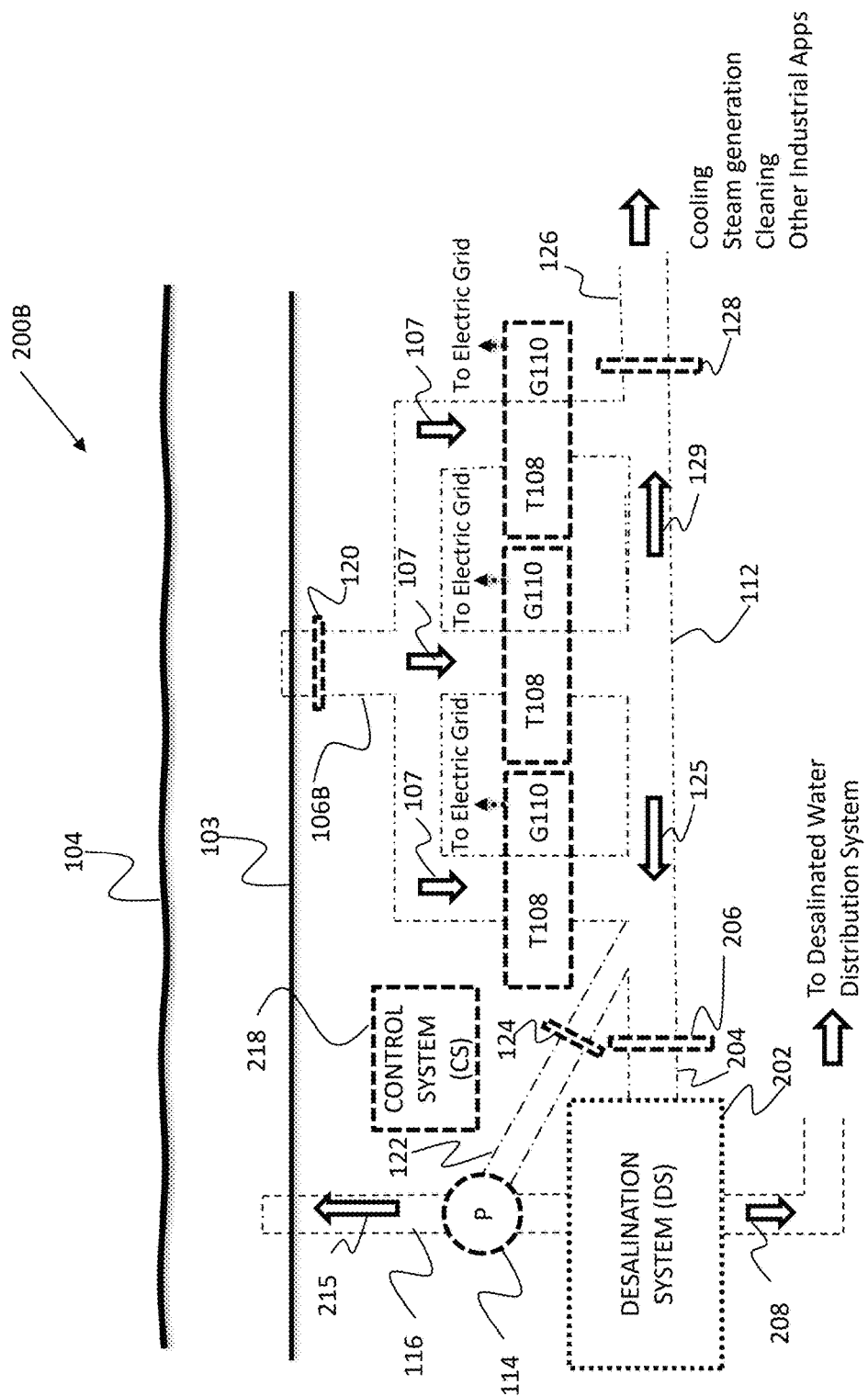
FIG. 6 schematically illustrates an exemplary implementation of the combined system shown in FIG. 4 in a modified configuration of the combined system shown in FIG. 5, according to an embodiment of the present invention.

Reference is now made to FIG. 6 which schematically illustrates an exemplary implementation of combined system 200 shown in FIG. 4 in a modified configuration of combined system 200A shown in FIG. 5, according to an embodiment of the present invention. The power generation section shown in the figure is substantially similar to that shown in FIG. 5 with the difference that the hydroelectric power generation system shown in the figure includes a large single entry conduit 106B with one inlet valve 120 which divides into three smaller conduits which then connect to three turbines T108. The desalination section shown in the figure is substantially similar to that shown in FIG. 5. The skilled person may readily appreciate that the embodiments shown in FIGS. 5 and 6 are functionally similar and that practicing the teachings associated with the systems shown therein and their operation do not deviate from the teachings of the present invention.

Figure 7:
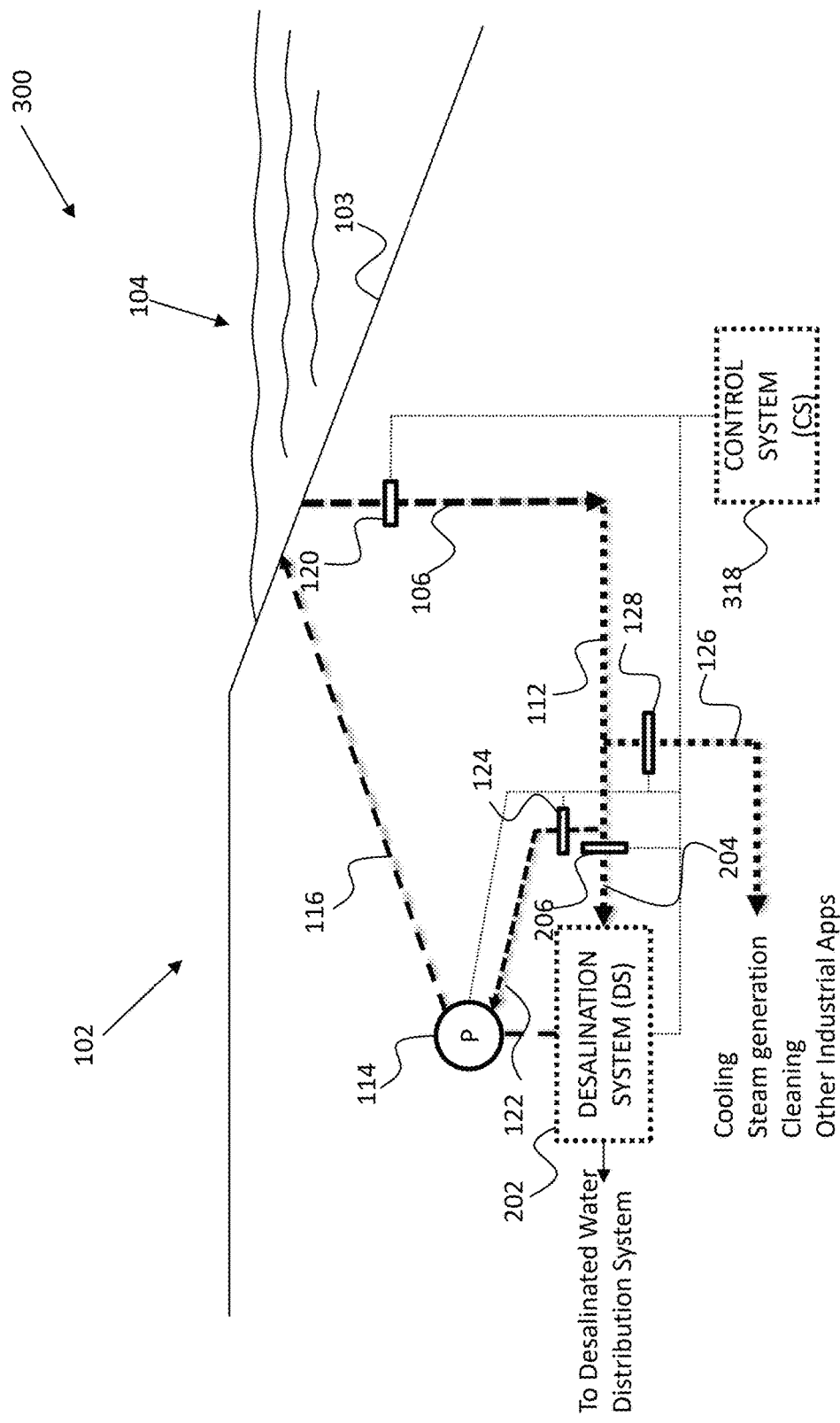
FIG. 7 schematically illustrates an underground desalination system, according to an embodiment of the present invention.

Reference is now made to FIG. 7 which schematically illustrates an underground desalination system 300, according to an embodiment of the present invention. Underground desalination system 300 may include underground desalination system 202 previously described and shown in FIG. 4. It may additionally include one or more conduits 106 with valves 206 also shown in FIG. 4, although not connected to turbines and through which seawater may flow into underground reservoir 112. It may additionally include other system components shown in FIG. 4 not used for hydroelectric power generation (turbine, generator, and electric grid interfacing), including those associated with industrial use of the seawater in reservoir 112. Also included may be a control system 318 which may be similar to control system 218 suitably modified to control only desalination system 300.

Figure 8:
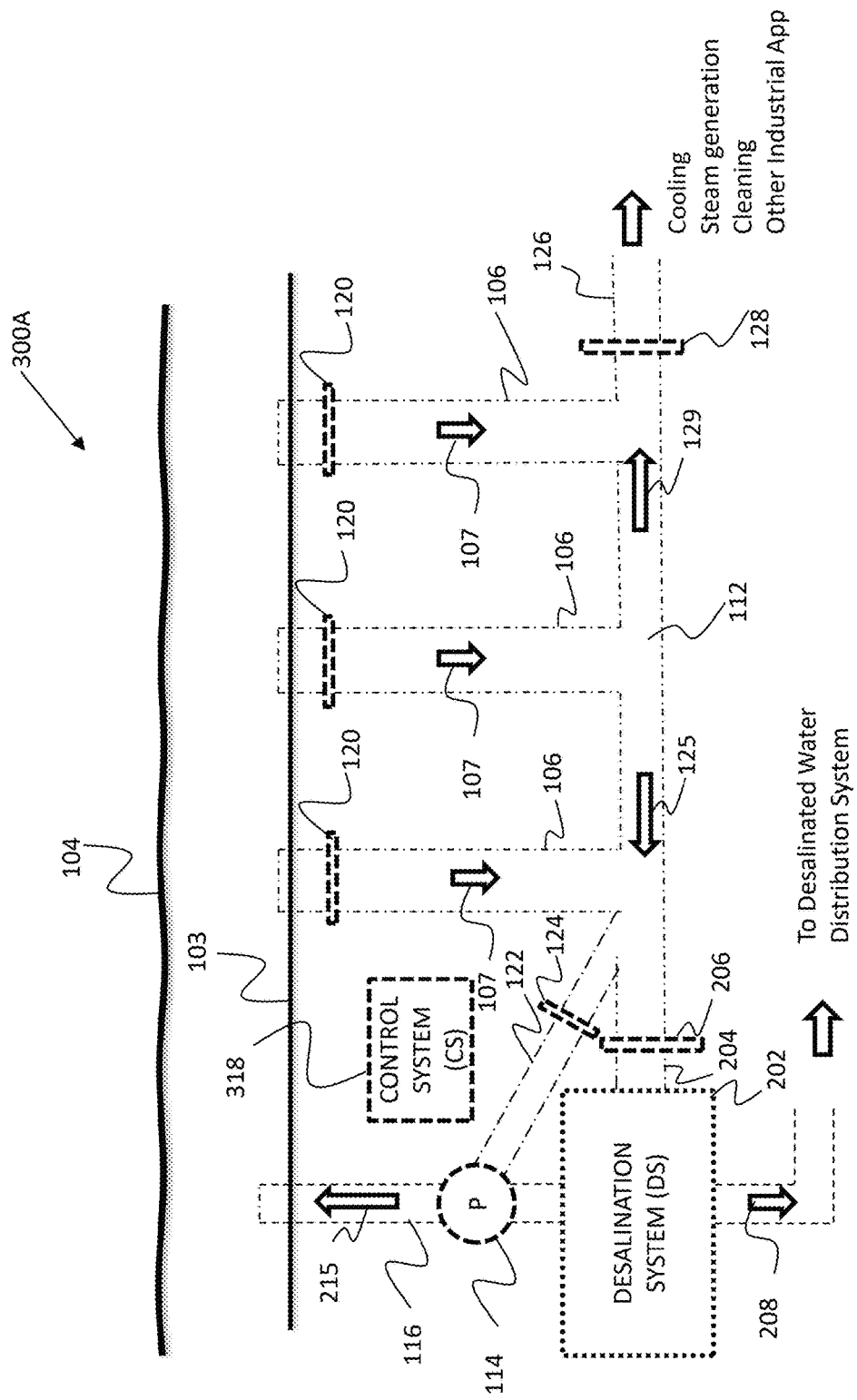
FIG. 8 schematically illustrates an exemplary implementation of the desalination system shown in FIG. 7 with multiple conduits, according to an embodiment of the present invention.

Reference is now made to FIG. 8 which schematically illustrates an exemplary implementation of desalination system 300 shown in FIG. 7 with multiple conduits, according to an embodiment of the present invention. Desalination system 300A shown in the figure may include three conduits 106 extending underground from sea floor 103, each conduit leading to underground reservoir 112. Desalination system 300A may additionally include pumping system 114, control system 318, reservoir 112, discharge pipe 116, feed pipe 122, outlet pipe 126, and valves 120, 124, and 128, all functionally similar to that in combined system 200. Desalination system 300A additionally includes desalination system 202, DS feed pipe 204, and DS inlet valve 206. In operation, the operation of desalination system 300A may be similar to that of combined system 200A shown in FIG. 5 without the hydroelectric power generation aspect.

Figure 9:
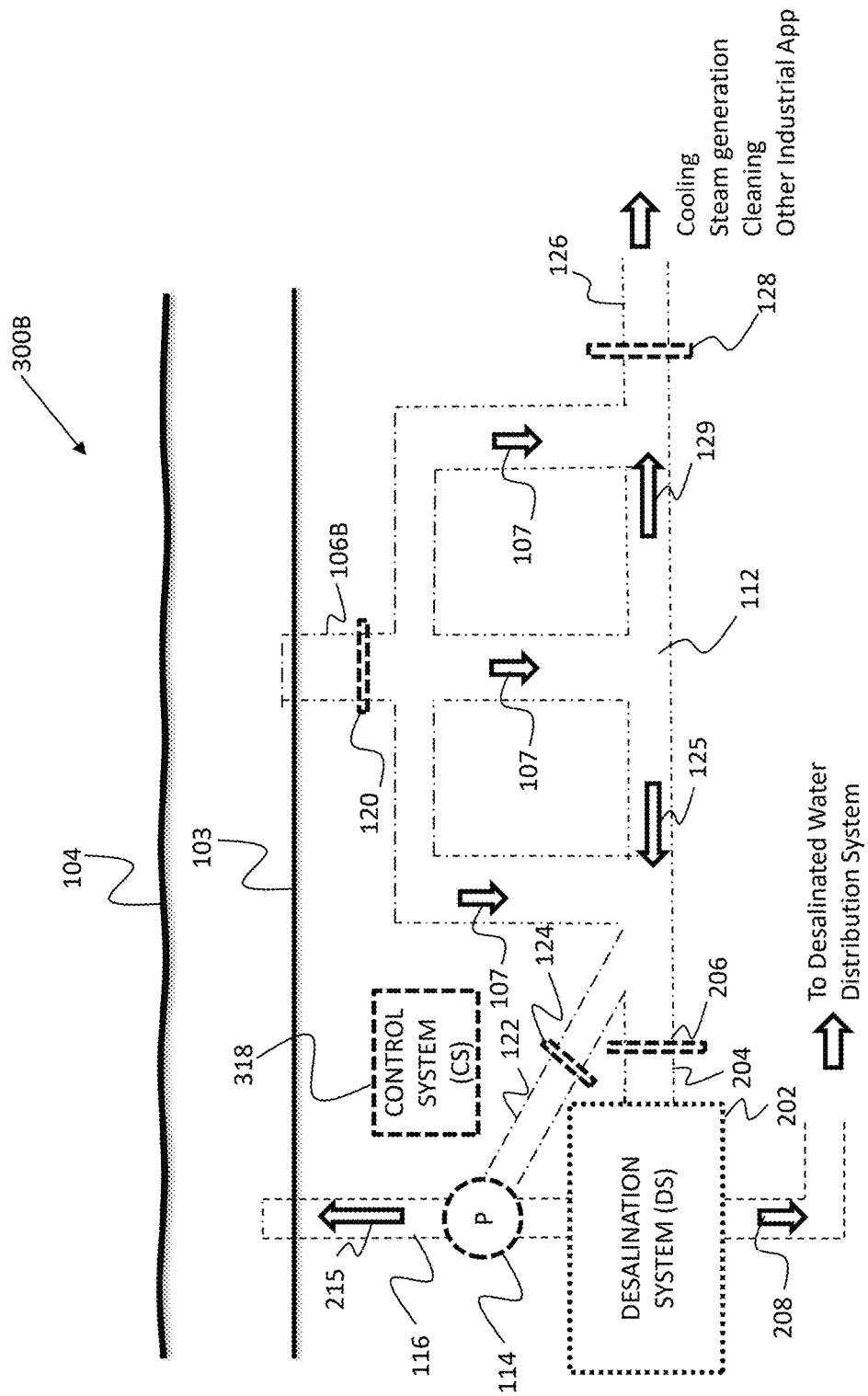
FIG. 9 schematically illustrates an exemplary implementation of the desalination system shown in FIG. 7 in a modified configuration of the desalination system shown in FIG. 8, according to an embodiment of the present invention.

Reference is now made to FIG. 9 which schematically illustrates an exemplary implementation of desalination system 300 shown in FIG. 7 in a modified configuration of desalination system 300A shown in FIG. 8, according to an embodiment of the present invention. The desalination section shown in the figure is substantially similar to that shown in FIG. 8 with the difference that the desalination system shown in the figure includes a large single entry conduit 106B with one inlet valve 120 which divides into three smaller conduits which then connect to reservoir 112. The skilled person may readily appreciate that the embodiments shown in FIGS. 8 and 9 are functionally similar and that practicing the teachings associated with the systems shown therein and their operation do not deviate from the teachings of the present invention.

Figure 10:
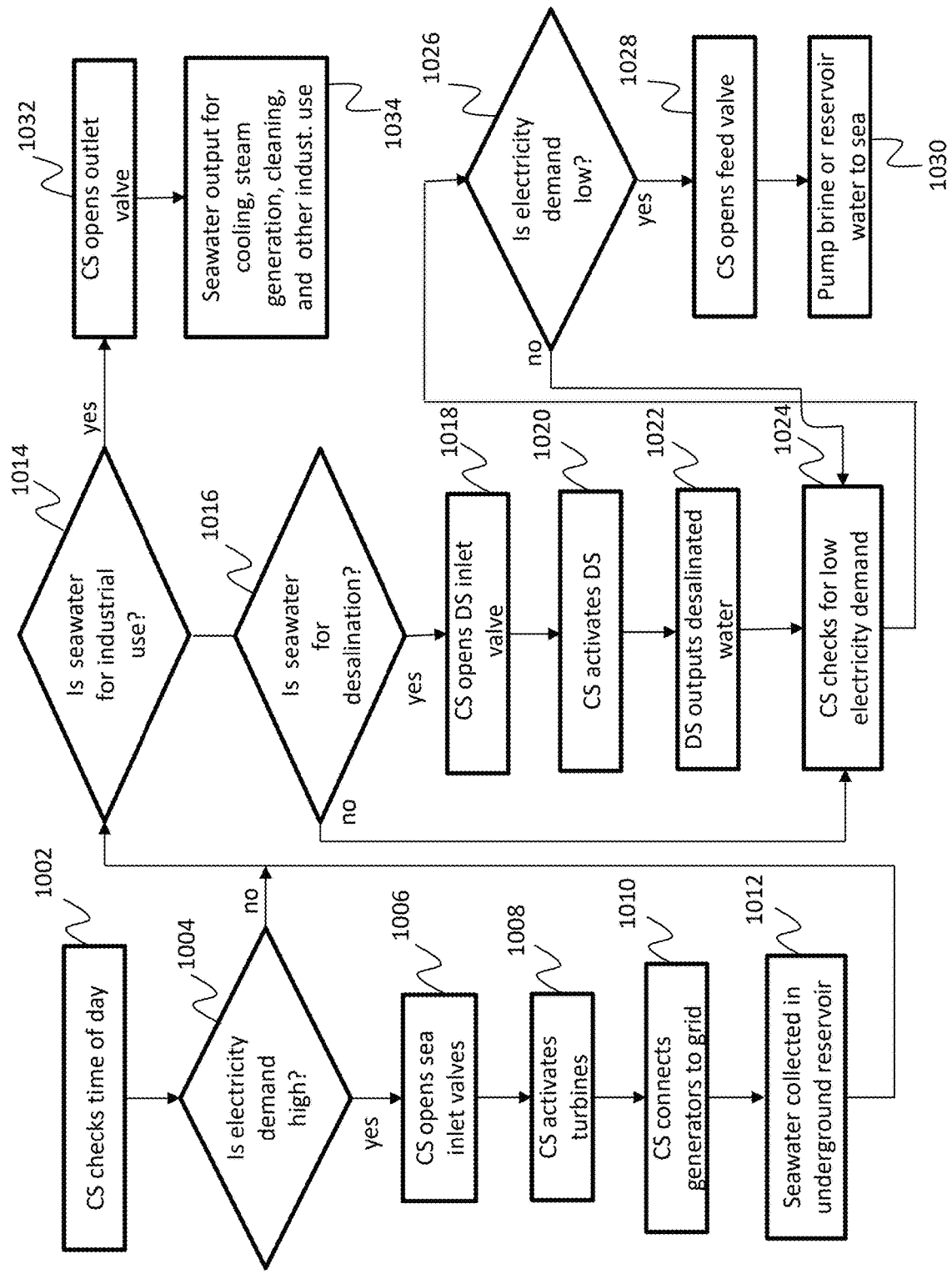
FIG. 10 is a flow chart of an exemplary method of operation of a combined underground hydroelectric power generation system and desalination system, according to an embodiment of the present invention.

Reference is made to FIG. 10 which is a flow chart of an exemplary method of operation of a combined underground hydroelectric power generation system and desalination system, according to an embodiment of the present invention. For clarity purposes, the method may be described herein with reference to the components shown in FIG. 4 in combined system 200. It may be appreciated by a person skilled in the art that the method may be practiced with more or less steps, and/or with a different sequence of steps.

At 1002, control system (CS) 218 may check the time of day.

At 1004, according to the time of day, CS 218 may determine if the time of day corresponds with the time when the demand for electricity is high, optionally at its peak. If yes, continue to 1006. If no, continue to 1014.

At 1006, CS 218 may open inlet valves 120 to allow seawater flow into conduits 106.

At 1008, CS 218 may activate turbines 108 so that water flowing down conduit 106 passes through the turbines which in turn rotate generators 110.

At 1010, CS 218 may connect the generators to the electric grid to allow electricity flow from the generators into the grid.

At 1012, seawater flowing through turbines 108 may flow into reservoir 112.

At 1014, CS 218 may check if seawater will be used for an industrial application. If yes, go to 1032 and then continue to 1016. If no, continue to 1016.

At 1016, CS 218 may check if seawater will be used for desalination. If yes, continue to 1018. If no, continue to 1024.

At 1018, CS 218 may open DS inlet valve 206 to allow seawater flow through DS feed pipe 204 into desalination system (DS) 202.

At 1020, CS 218 may signal DS 202 to start desalination.

At 1022, D202 may desalinate seawater and may output the water to the desalinated water distribution system as drinking water or agricultural irrigation water. The brine generated from the desalination process may be stored in underground pools.

At 1024, CS 218 may check the time of day.

At 1026, according to the time of day, CS 218 may determine if the time of day corresponds with the time when the demand for electricity is low, optionally at its lowest. If yes, continue to 1028. If no, return to 1024 when CS.

At 1028, CS 218 opens feed valve 124 to allow seawater from reservoir 112 to mix with the brine in the pools, diluting the brine, or alternatively, if no desalination is performed, to reduce the level of seawater in the reservoir and partially or wholly drain the reservoir.

At 1030, pumping system 114 may pump the seawater from reservoir 112 or the diluted brine through discharge pipe 116 out to sea.

Figure 11:
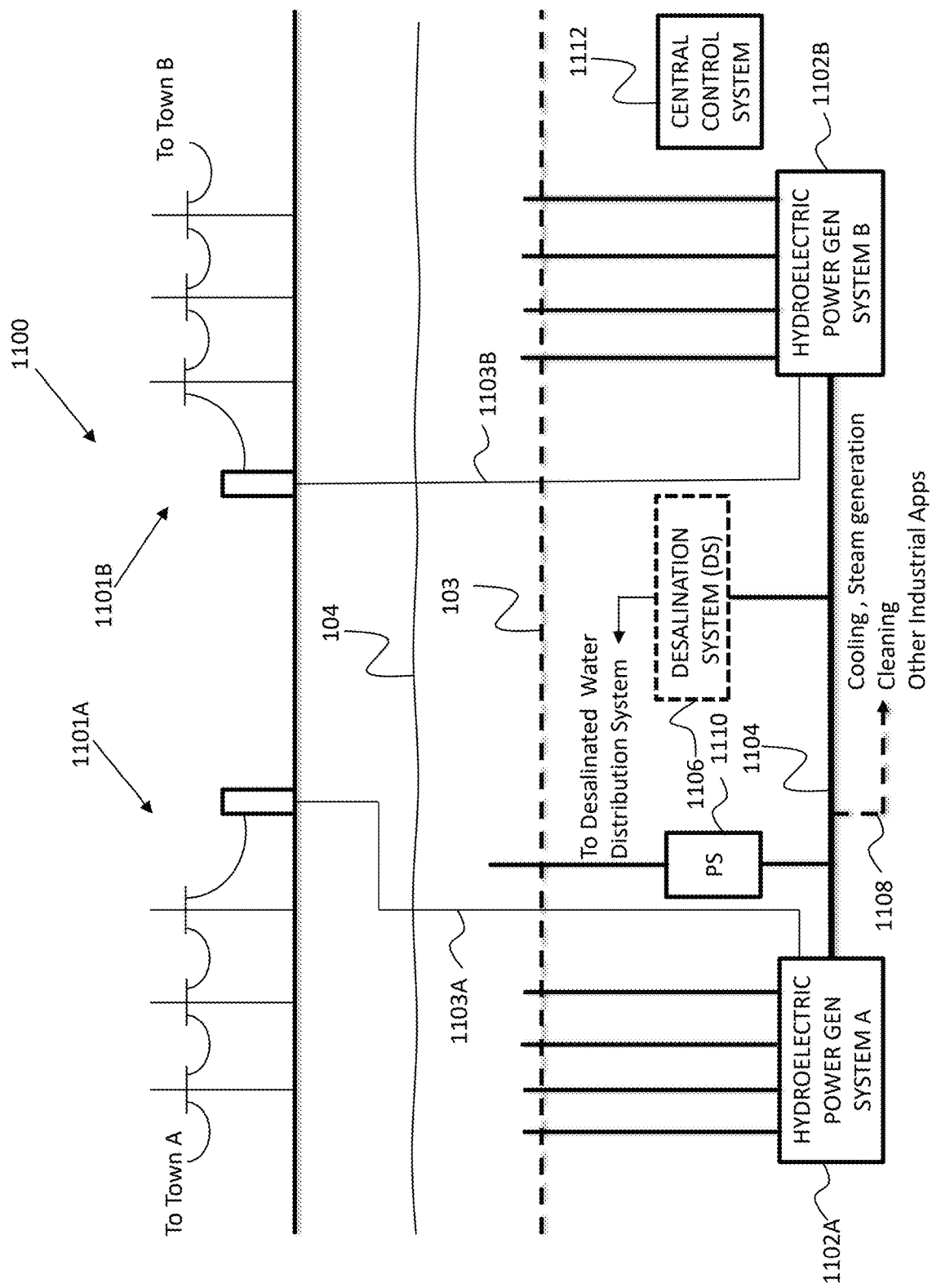
FIG. 11 schematically illustrates an exemplary distributed underground hydroelectric power generation system, according to an embodiment of the present invention.

Reference is now made to FIG. 11 which schematically illustrates an exemplary distributed underground hydroelectric power generation system 1100, according to an embodiment of the present invention. Distributed underground hydroelectric power generation system 1100 is shown, for illustrative purposes, as including two underground hydroelectric power generation systems, hydroelectric power generation system A 1102A and hydroelectric power generation system B 1102B, an optional underground central desalination system (DS) 1106, an optional underground centralized outlet pipe and control valves 1108, an underground centralized pumping system 1110, and an underground centralized control system 1112.

Underground hydroelectric power generation system 1102A may be located proximal to a Town A and may generate electricity which may be fed through a transmission interface 1103A to electric grid 1101A which supplies electricity to Town A. Underground hydroelectric power generation system 1102B may be located proximal to a Town B, which may be remotely located from Town A, and may generate electricity which may be fed through a transmission interface 1103B to electric grid 1101B which supplies electricity to Town B. Underground hydroelectric power generation system 1102A and 1102B may be interconnected by an underground reservoir 1104 which may be a tunnel where the seawater used to generate the electricity is collected. Reservoir 1104 may be of a length to cover the distance between the two hydroelectric power generation systems, for example, 10 km, 15 km, 25 km, 30 km, 50 km, 100 km, or more or less.

Distributed underground hydroelectric power generation system 1100 may include a centralized configuration wherein optional desalination system 1106, pumping system 1110, and optional outlet pipe and valves 1108 through which seawater may be transported for use in industrial applications, may all be connected to reservoir 1104. Additionally, centralized control system 1112 may control the operation of some or all of the components in distributed underground hydroelectric power generation system 1100.

In FIG. 11 schematically illustrating exemplary distributed underground hydroelectric power generation system 1100, it may be appreciated that some or all of the components shown therein may be functionally similar in operation to those shown in any one of the previous FIGS. 1-9. Furthermore, the skilled person may appreciate that the embodiment of FIG. 11 is for exemplary purposes, and that the distributed underground hydroelectric power generation system 1100 of the present invention may be practiced in numerous configurations which may include a centralized configuration as shown, hydroelectric power generation systems and optional desalination systems arranged in clusters which may be interconnected, among other configurations which may include, but not limited to, sharing of any one or more of system components such as a reservoir (e.g. tunnel), a desalination system, a pumping system, a control system, and an interface for industrial applications.

Figure 12:
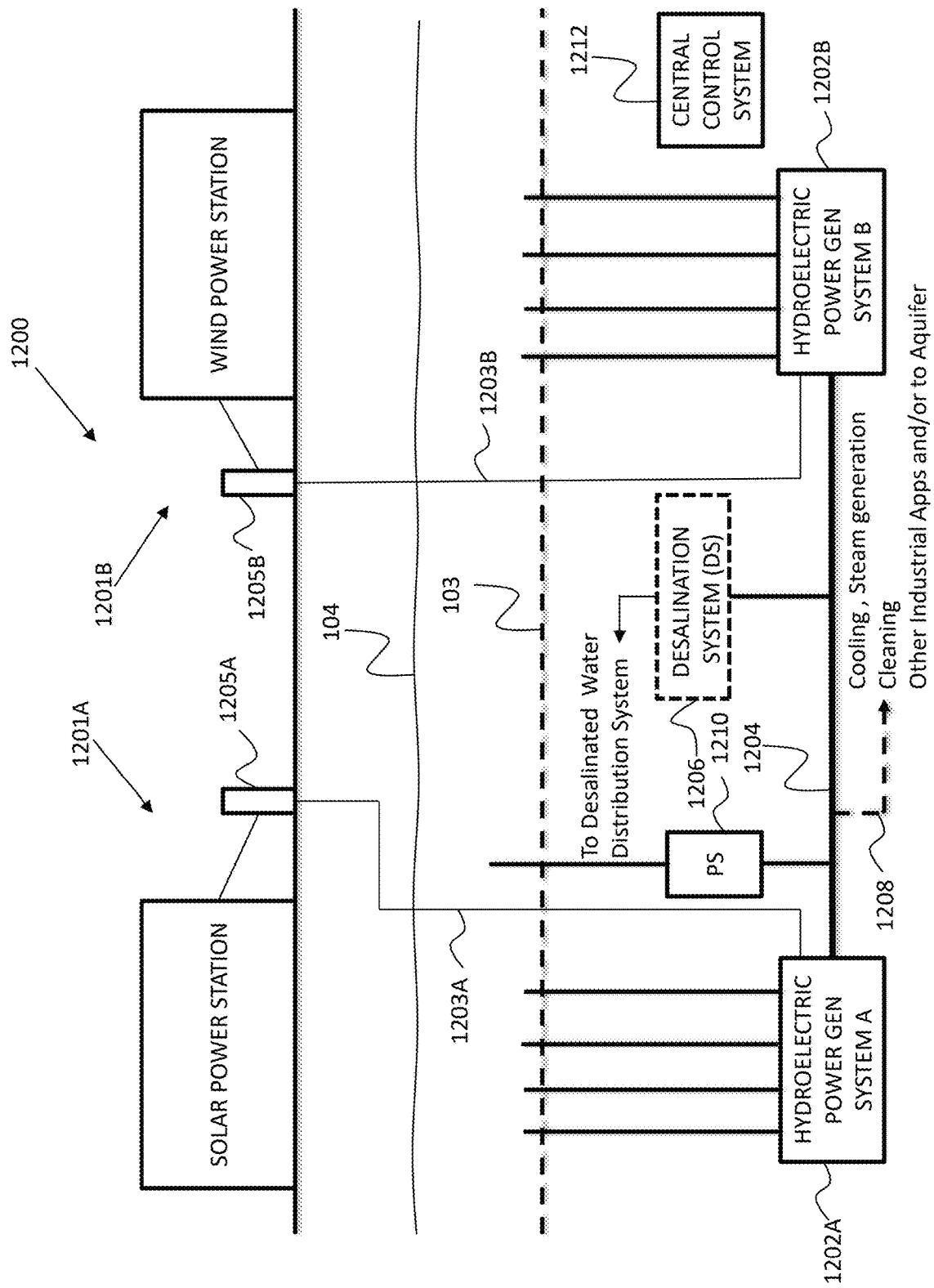
FIG. 12 schematically illustrates an exemplary distributed underground hydroelectric power generation system as a backup system for a solar energy electricity generating station and/or a wind power electricity generating station, according to an embodiment of the present invention.

Reference is now made to FIG. 12 which schematically illustrates an exemplary distributed underground hydroelectric power generation system 1200 as a backup system for a solar energy electricity generating station 1201A and/or a wind power electricity generating station 1201B, according to an embodiment of the present invention. Distributed underground hydroelectric power generation system 1200 is shown, for illustrative purposes, as including two underground hydroelectric power generation systems, hydroelectric power generation system A 1202A and hydroelectric power generation system B 1202B, an optional underground central desalination system (DS) 1206, an optional underground centralized outlet pipe and control valves 1208, an underground centralized pumping system 1210, an underground reservoir, and an underground centralized control system 1212.

Underground hydroelectric power generation system 1202A may be located proximal to the solar energy electricity generating 1201A and may generate electricity responsive to a sensor 1205A detecting a drop in solar power generation based on a predetermined criteria. Sensor 1205A signaling may be sent over a communication interface 1103A to hydroelectric power generation system 1202A or alternatively to centralized control system 1212. Responsive to sensing of the drop in the solar power generation, the inlet valve at the conduits may be opened to allow water to flow in from the sea and through the turbines to generate electricity.

Underground hydroelectric power generation system 1202B may be located proximal to the wind power electricity generating station 1201B and may generate electricity responsive to a sensor 1205B detecting a drop in wind power electricity generation based on a predetermined criteria. Sensor 1205B signaling may be sent over a communication interface 1103B to hydroelectric power generation system 1202B or alternatively to centralized control system 1212. Responsive to sensing of the drop in the solar power generation, the inlet valve at the conduits may be opened to allow water to flow in from the sea and through the turbines to generate electricity.

In some embodiments, underground hydroelectric power generation system 1202A and 1202B may be interconnected by an underground reservoir 1204 which may be a tunnel where the seawater used to generate the electricity is collected. Reservoir 1204 may be of a length to cover the distance between the two hydroelectric power generation systems, for example, 10 km, 15 km, 25 km, 30 km, 50 km, 100 km, or more or less. Alternatively, the hydroelectric power generation systems are not interconnected by reservoir 1204 so that each system may have its own reservoir.

In FIG. 12 schematically illustrating exemplary distributed underground hydroelectric power generation system 1200, it may be appreciated that some or all of the components shown therein may be functionally similar in operation to those shown in any one of the previous FIGS. 1-9 and 11. Furthermore, the skilled person may appreciate that the embodiment of FIG. 12 is for exemplary purposes, and that the distributed underground hydroelectric power generation system 1200 of the present invention may be practiced in numerous configurations which may include a centralized configuration as shown, hydroelectric power generation systems and optional desalination systems arranged in clusters which may be interconnected, among other configurations which may include, but not limited to, sharing of any one or more of system components such as a reservoir (e.g. tunnel), a desalination system, a pumping system, a control system, and an interface for industrial applications. Additionally, the skilled person may appreciate that instead of a distributed system, a single underground hydroelectric power generation system may be connected to any one of a single solar energy electricity generating station, multiple solar energy electricity generating stations, a single wind power electricity generating station, and multiple wind power electricity generating stations.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

The foregoing description and illustrations of the embodiments of the invention has been presented for the purposes of illustration. It is not intended to be exhaustive or to limit the invention to the above description in any form.

Any term that has been defined above and used in the claims, should be interpreted according to this definition.

The invention claimed is:

1. A hydroelectric power generation system comprising:
   at least one conduit extending from beneath the sea surface a predetermined depth into the ground below the sea floor level, wherein said at least one conduit conducts gravity-induced seawater flow;
   a turbine connected to an underground distal end of each of said at least one conduit to convert gravitational energy of all seawater flowing down said at least one conduit into rotational mechanical energy, wherein all said seawater flowing down said at least one conduit directly is directed onto said connected turbine during hours of high electricity demand;
   a generator connected to said turbine to convert said rotational mechanical energy into electrical energy;
   a power transmission means to transfer electricity generated by said generator to an electric grid;
   an underground seawater reservoir in fluid communication with said at least one conduit and said connected turbine, said underground reservoir configured to:
      collect all said seawater flowing down through said at least one conduit and said connected turbine,
      dispose of at least a portion of said collected seawater by seepage into the ground to reduce a need for active pumping and enhance energy efficiency, and
      store residual seawater not disposed of by seepage for desalination or later controlled release into the sea;
   an underground desalination system to desalinate said residual seawater collected in said underground seawater reservoir; and
   an underground pumping system, wherein said underground pumping system is configured to:
      be selectively activated during low electricity demand hours, and
      pump into the sea residual seawater in said underground seawater reservoir and not used for desalination, thereby minimizing energy consumption and optimizing system efficiency.

2. The hydroelectric power generation system according to claim 1 wherein the hydroelectric power generation system is located in a desertic area.

3. The hydroelectric power generation system according to claim 1 wherein said seawater seepage from said underground reservoir is collected in a seawater or brackish water aquifer.

4. The hydroelectric power generation system according to claim 1 wherein the hydroelectric power generation system is configured to serve as a backup energy generation system for a renewable energy generation system.

5. The hydroelectric power generation system according to claim 1 comprising an underground discharge pipe coupled to said underground pumping system to transport said residual seawater not used for desalination from said underground pumping system to the sea.

6. The hydroelectric power generation system according to claim 1 comprising an underground feed pipe joining said underground seawater reservoir to said underground pumping system to transport said residual seawater not used for desalination from said underground seawater reservoir to said pumping system.

7. The hydroelectric power generation system according to claim 1 further comprising an underground outlet pipe coupled to said underground seawater reservoir to transport a portion of said residual seawater collected in said underground seawater reservoir from said reservoir to an industrial use seawater distribution system.

8. The hydroelectric power generation system according to claim 1 further comprising a control system to enable operation of said turbine connected to each of said at least one conduit during hours of high demand for electricity.

9. The hydroelectric power generation system according to claim 8 wherein said control system is configured to activate said underground pumping system during hours of low demand for electricity.

10. The hydroelectric power generation system according to claim 1 comprising a reverse osmosis filtration system.

11. The hydroelectric power generation system according to claim 10 wherein said reverse osmosis filtration system comprises membranes arranged to filter said residual seawater for desalination flowing in an upward direction.

12. The hydroelectric power generation system according to claim 1 comprising an underground desalination feed pipe to transport said residual seawater for desalination from said underground seawater reservoir to said desalination plant.

13. The hydroelectric power generation system according to claim 1 wherein a portion of said residual seawater collected in said underground seawater reservoir is directed to feed an above ground artificial lake in a desert area.

14. The hydroelectric power generation system according to claim 13 wherein said portion of said residual seawater directed to feed said above ground artificial desert lake is first desalinated in said underground desalination system.

15. The hydroelectric power system according to claim 1 further comprising a sensor to measure an output power generated by a solar energy electricity generating system and configured to activate operation of the hydroelectric power system to generate electricity when said output power of said solar energy electricity generating system drops below a predetermined threshold.

16. The hydroelectric power system according to claim 1 further comprising a sensor to measure an output power generated by a wind power electricity generating system and configured to activate operation of the hydroelectric power system to generate electricity when said output power of said wind power electricity generating system drops below a predetermined threshold.

17. A distributed hydroelectric power generation system comprising:
  a plurality of hydroelectric power generation systems, each hydroelectric power generation system comprising:
    at least one conduit extending from beneath the sea surface a predetermined depth into the ground below the sea floor level, wherein said at least one conduit conducts gravity-induced seawater flow;
    a turbine connected to an underground distal end of each of said at least one conduit to convert gravitational energy of all seawater flowing down said at least one conduit into rotational mechanical energy, wherein all said seawater flowing down said at least one conduit directly is directed onto said connected turbine during hours of high electricity demand;
    a generator connected to said turbine to convert said rotational mechanical energy into electrical energy; and
    a power transmission means to transfer electricity generated by said generator to an electric grid;
  an underground seawater reservoir in fluid communication with said at least one conduit and said connected turbine in each hydroelectric power generation system, said underground reservoir to:
    collect all said seawater flowing down through all of said conduits and said connected turbines in said plurality of hydroelectric power generation systems,
    dispose of at least a portion of said collected seawater by seepage into the ground to reduce a need for active pumping and enhance energy efficiency,
    store residual seawater not disposed of by seepage for desalination or later controlled release into the sea;
  an underground desalination system to desalinate said residual seawater collected in said underground seawater reservoir; and
  an underground pumping system, wherein said underground pumping system is configured to:
    be selectively activated during low electricity demand hours, and
    pump into the sea said residual seawater in said underground seawater reservoir and not used for desalination, thereby minimizing energy consumption and optimizing system efficiency.

18. The distributed hydroelectric power generation system according to claim 17 wherein said underground seawater reservoir comprises a tunnel, and wherein at least one hydroelectric power generation system of said distributed system is located in a desertic area.

* * * * *